(12) United States Patent
Wu et al.

(10) Patent No.: US 11,032,807 B2
(45) Date of Patent: *Jun. 8, 2021

(54) UPLINK CONTROL INFORMATION TRANSMISSION IN OVERLAPPING TIME DOMAIN RESOURCE

(71) Applicant: HUAWEI TECHNOLOGIES CO., LTD., Shenzhen (CN)

(72) Inventors: Zuomin Wu, Shenzhen (CN); Chaojun Li, Beijing (CN); Yongxia Lyu, Ottawa (CA); Sha Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/886,747

(22) Filed: May 28, 2020

(65) Prior Publication Data
US 2020/0296718 A1 Sep. 17, 2020

Related U.S. Application Data

(63) Continuation of application No. 16/051,514, filed on Aug. 1, 2018, now Pat. No. 10,681,682, which is a (Continued)

(51) Int. Cl.
H04W 72/04 (2009.01)
H04L 1/18 (2006.01)
(Continued)

(52) U.S. Cl.
CPC ...... *H04W 72/0413* (2013.01); *H04B 7/0626* (2013.01); *H04L 1/1854* (2013.01);
(Continued)

(58) Field of Classification Search
CPC ............. H04W 72/0413; H04W 72/04; H04W 72/1284; H04W 72/1268; H04W 74/004;
(Continued)

(56) References Cited

U.S. PATENT DOCUMENTS 7,086,701 B2 8/2006 Rashid et al.
8,837,410 B2 9/2014 Baldemair et al.
(Continued)

FOREIGN PATENT DOCUMENTS

CN 1436411 A 8/2003
CN 104468030 A 3/2015
EP 2547030 A2 1/2013

OTHER PUBLICATIONS

XP051002942 R1-156502 Intel Corporation,"Remaining aspects of PUCCH for MTC",3GPP TSG RAN WG1 Meeting #83,Anaheim, USA, Nov. 16-20, 2015,total 5 pages.
(Continued)

*Primary Examiner* — Ian N Moore
*Assistant Examiner* — Brian T Le
(74) *Attorney, Agent, or Firm* — Kilpatrick Townsend & Stockton LLP

(57) ABSTRACT

Various embodiments provide a communication method. The method includes: determining, by a terminal device, first uplink control information and second uplink control information. In those embodiments, a length of a time domain resource corresponding to the first uplink control information is less than a length of a time domain resource corresponding to the second uplink control information. The first uplink control information or the second uplink control information comprises at least one of hybrid automatic repeat request information, channel state information, and scheduling request information. When the time domain resource corresponding to the first uplink control information overlaps with the time domain resource corresponding to the second uplink control information, the terminal device is configured to transmit third uplink control information on the overlapping time domain resource.

27 Claims, 8 Drawing Sheets

Related U.S. Application Data continuation of application No. PCT/CN2016/073108, filed on Feb. 1, 2016.

(51) Int. Cl.
*H04L 5/00* (2006.01)
*H04B 7/06* (2006.01)
*H04W 72/12* (2009.01)

(52) U.S. Cl.
CPC .......... *H04L 1/1861* (2013.01); *H04L 5/0053* (2013.01); *H04L 5/0094* (2013.01); *H04W 72/04* (2013.01); *H04W 72/1268* (2013.01)

(58) Field of Classification Search
CPC ... H04B 7/0626; H04L 1/1854; H04L 1/1861; H04L 1/1858; H04L 1/1864; H04L 1/1829; H04L 5/0053; H04L 5/0055; H04L 5/0057; H04L 5/0094; H04L 5/0092; H04L 5/0096; H04L 5/0091
See application file for complete search history.

(56) References Cited

U.S. PATENT DOCUMENTS

| | | |
|---|---|---|
| 2010/0195629 A1 | 8/2010 | Chen et al. |
| 2011/0268048 A1 | 11/2011 | Toskala et al. |
| 2012/0327916 A1* | 12/2012 | Ahn ................... H04L 1/1671 370/336 |
| 2013/0279455 A1 | 10/2013 | Park et al. |
| 2017/0164363 A1 | 6/2017 | Zhang et al. |
| 2017/0223694 A1* | 8/2017 | Han ................. H04W 72/1284 |

OTHER PUBLICATIONS

XP051022329 R1-156461 Huawei, HiSilicon,"Control signaling enhancements for short TTI",3GPP TSG RAN WG1 Meeting #83,Anaheim, USA, Nov. 15-22, 2015,total 6 pages.
3GPP TSG RAN WG1 #83,R1-156822:"Study on specification impact for uplink due to TTI shortening", Samsung , Anaheim, USA, Nov. 15-22, 2015,total 3 pages.

* cited by examiner

… (1) …

UPLINK CONTROL INFORMATION TRANSMISSION IN OVERLAPPING TIME DOMAIN RESOURCE

CROSS REFERENCE TO RELATED APPLICATIONS

This application is a continuation of U.S. patent application Ser. No. 16/051,514, filed on Aug. 1, 2018, which is a continuation of International Application No. PCT/CN2016/073108, filed on Feb. 1, 2016. All of the afore-mentioned patent applications are hereby incorporated by reference in their entireties.

TECHNICAL FIELD

The present application relates to the communications field, and in particular, to an uplink control information transmission method and apparatus.

BACKGROUND

In a communications network, a delay is a key performance indicator (Key Performance Indicator, KPI), and also affects use experience of users. With development of communications protocols, a scheduling interval of a physical layer that affects a delay most obviously is also increasingly small. A scheduling interval is 10 ms in initial Wideband Code Division Multiple Access (Wideband Code Division Multiple Access, WCDMA), a scheduling interval is shortened to 2 ms in High-Speed Packet Access (High-Speed Packet Access, HSPA), and a scheduling interval is shortened to 1 ms in Long Term Evolution (Long Term Evolution, LTE).

Due to a small-delay service requirement, a short transmission time interval (Transmission Time Interval, TTI) frame structure needs to be introduced in an LTE physical layer, so as to further shorten a scheduling interval, and a TTI may be shortened from 1 ms to a value between 1 symbol (symbol) to 0.5 ms. The aforementioned symbol may be an orthogonal frequency division multiplexing (Orthogonal Frequency Division Multiplexing, OFDM) symbol in an LTE system.

FIG. 1 is a diagram of an RTT (Round-Trip Time, round-trip time) delay of data transmission of a base station. As shown in FIG. 1, based on a hybrid automatic repeat request (Hybrid Automatic Repeat Request, HARQ) technology, if the base station transmits data to user equipment in a TTI that is numbered i in a downlink (Downlink, DL for short) link, and if the user equipment correctly demodulates and decodes the received data, the user equipment feeds back an acknowledgement (Acknowledgement, ACK) to the base station in a TTI that is numbered i+4 in an uplink (uplink, UL for short) link. If the user equipment has not correctly demodulated or decoded the received data, the user equipment feeds back a negative acknowledgement (Negative Acknowledgment, NACK) to the base station in the TTI that is numbered i+4, and the base station determines, based on the ACK or NACK received in the TTI that is numbered i+4, to perform initial data transmission or data retransmission processing in a TTI that is numbered i+8 in the downlink link. The ACK or NACK that is fed back may also be collectively referred to as HARQ-ACK information. In the prior art, lengths of TTIs for transmission in both the uplink link and the downlink link are 1 ms. If a short TTI transmission technology is introduced, for example, when the lengths of the TTIs for transmission in the uplink link and the downlink link are shortened to 0.5 ms or one or more symbols, it may be considered that a processing time is reduced in equal proportion, and the foregoing RTT delay also applies.

LTE supports a carrier aggregation technology, that is, the base station configures a plurality of carriers for one UE to improve a data rate of the UE. The UE supporting the carrier aggregation technology may simultaneously detect downlink data on a plurality of downlink carriers, and the UE needs to simultaneously make a HARQ feedback mechanism for the downlink data on the plurality of downlink carriers. Therefore, it requires that one channel can support HARQ-ACK information of the downlink data on the plurality of downlink carriers. In addition, to enable the base station to schedule the UE and transmit the downlink data on the plurality of downlink carriers, the UE needs to feed back channel state information CSI (Channel State Information) on the carriers to the base station. In a particular uplink TTI, the UE may need to simultaneously feed back HARQ-ACK feedback information for downlink scheduling data and the CSI information on the plurality of carriers to the base station. The UE may further send scheduling request (Scheduling Request, SR) information to the base station, to request an uplink UL-SCH resource from the base station.

When the UE supports receiving data on a plurality of downlink carriers of different TTI lengths, the UE may need to feed back HARQ-ACK feedback information for downlink scheduling data and the CSI information on the plurality of carriers to the base station in a particular uplink TTI. Because TTI lengths on different downlink carriers are different, delays corresponding to a HARQ-ACK feedback time sequence and a CSI feedback time sequence on different downlink carriers may be different, and consequently the UE may need to transmit HARQ-ACK information and CSI information that correspond to different downlink TTI lengths in the particular uplink TTI. Using the HARQ-ACK feedback time sequence as an example, FIG. 2 is a diagram of an RTT delay of data transmission corresponding to carriers of different TTI lengths. As shown in FIG. 2, FIG. 2 includes one uplink carrier (Component carrier, component carrier, CC for short) and two downlink carriers, and the two downlink carriers are respectively a downlink carrier 1 and a downlink carrier 2. A time length of a TTI of the downlink carrier 1 is equal to that of the uplink carrier, and a time length of a TTI of the downlink carrier 2 is not equal to that of the downlink carrier 1. If a base station sends data in a TTI that is numbered i+2 and that is of the downlink carrier 1, after receiving the data, UE feeds back uplink control information in a TTI that is numbered i+6 and that is of the uplink carrier. If the base station sends data in a TTI that is numbered i and that is of the downlink carrier 2, after receiving the data, the UE feeds back uplink control information at a moment corresponding to a TTI that is numbered i+4 and that is of the downlink carrier 2, that is, in the TTI that is numbered i+6 and that is of the uplink carrier. That is, a feedback conflict of HARQ-ACK information may occur in the TTI that is numbered i+6 and that is of the uplink carrier.

In the prior art, there has been no processing method for transmitting uplink control information when there are a plurality of pieces of uplink control information corresponding to time domain resources of different lengths and a conflict occurs between the time domain resources corresponding to the plurality of pieces of uplink control information.

SUMMARY

In view of this, an objective of embodiments of the present application is to provide an uplink control information transmission method, so as to resolve an uplink control information transmission problem when there are a plurality of pieces of uplink control information corresponding to time domain resources of different lengths and a conflict occurs between the time domain resources corresponding to the plurality of pieces of uplink control information.

To resolve the foregoing technical problem, the embodiments of the present application disclose the following technical solutions.

According to a first aspect, an uplink control information transmission method is provided. The method includes:

determining, by user equipment, first uplink control information and second uplink control information, where a length of a time domain resource corresponding to the first uplink control information is less than a length of a time domain resource corresponding to the second uplink control information, and the first uplink control information or the second uplink control information includes at least one of hybrid automatic repeat request information, channel state information, and scheduling request information; and when the time domain resource corresponding to the first uplink control information overlaps with the time domain resource corresponding to the second uplink control information, transmitting, by the user equipment, third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the length of the time domain resource corresponding to the first uplink control information is less than one millisecond.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Optionally, the third uplink control information includes the fourth uplink control information, and the method further includes:

sending, by the user equipment, the fifth uplink control information on a time domain resource that does not include the overlapping time domain resource and that is in the time domain resource corresponding to the second uplink control information.

Optionally, the third uplink control information includes the fifth uplink control information, and the method further includes:

sending, by the user equipment, the fourth uplink control information on a time domain resource that does not include the overlapping time domain resource and that is in the time domain resource corresponding to the first uplink control information.

Optionally, the third uplink control information includes the fourth uplink control information and the fifth uplink control information, and the method further includes at least one of the following steps:

sending, by the user equipment, the third uplink control information on a resource that corresponds to the first uplink control information and that is in the overlapping time domain resource; and sending, by the user equipment, the third uplink control information on a resource that corresponds to the second uplink control information and that is in the overlapping time domain resource.

Optionally, the method further includes:

receiving, by the user equipment, indication information sent by a base station, where the indication information includes at least one of the following information:

resource allocation information of the time domain resource corresponding to the first uplink control information;

resource allocation information of the time domain resource corresponding to the second uplink control information;

indication information of the overlapping time domain resource; and indication information of the third uplink control information.

The method of this embodiment of the present application can resolve an uplink control information transmission problem when there are a plurality of pieces of uplink control information corresponding to time domain resources of different lengths and a conflict occurs between the time domain resources corresponding to the plurality of pieces of uplink control information.

According to a second aspect, an uplink control information transmission method is provided. The method includes:

determining, by user equipment, first uplink control information, where a length of a time domain resource corresponding to the first uplink control information is less than one millisecond, the time domain resource corresponding to the first uplink control information includes M preset time domain resources, M is an integer greater than or equal to one, and the first uplink control information includes at least one of hybrid automatic repeat request information, channel state information, and scheduling request information; and sending, by the user equipment, all information of the first uplink control information on each of the M preset time domain resources, where a length corresponding to each of the M preset time domain resources is less than six symbols.

Optionally, that the length corresponding to each of the M preset time domain resources is less than six symbols includes:

the length corresponding to each of the M preset time domain resources is one symbol;

the length corresponding to each of the M preset time domain resources is two symbols; or the length corresponding to each of the M preset time domain resources is three symbols.

Optionally, the method further includes:

determining, by the user equipment, second uplink control information, where the second uplink control information includes at least one of hybrid automatic repeat request information, channel state information, and scheduling request information;

sending, by the user equipment, the second uplink control information on a time domain resource corresponding to the second uplink control information, where the length of the time domain resource corresponding to the first uplink control information is less than a length of the time domain resource corresponding to the second uplink control information; and when the time domain resource corresponding to the first uplink control information overlaps with the time domain resource corresponding to the second uplink control information, transmitting, by the user equipment, third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Based on the uplink control information transmission channel structure or method that is provided in this embodiment of the present application, uplink control information can still be correctly demodulated when the uplink control information is transmitted on some of a time domain resource that corresponds to the uplink control information and that is pre-allocated for the uplink control information.

According to a third aspect, an uplink control information transmission method is provided. The method includes:

receiving, by a base station, first uplink control information on a time domain resource corresponding to the first uplink control information, and receiving second uplink control information on a time domain resource corresponding to the second uplink control information, where a length of the time domain resource corresponding to the first uplink control information is less than a length of the time domain resource corresponding to the second uplink control information, and the first uplink control information or the second uplink control information includes at least one of hybrid automatic repeat request information, channel state information, and scheduling request information; and when the time domain resource corresponding to the first uplink control information overlaps with the time domain resource corresponding to the second uplink control information, receiving, by the base station, third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the length of the time domain resource corresponding to the first uplink control information is a first transmission time interval time length, and the length of the time domain resource corresponding to the second uplink control information is a second transmission time interval time length;

the first transmission time interval time length is less than the second transmission time interval time length; and the first transmission time interval time length is less than one millisecond.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Optionally, the third uplink control information includes the fourth uplink control information, and the method further includes:

receiving, by the base station, the fifth uplink control information on a time domain resource that does not include the overlapping time domain resource and that is in the time domain resource corresponding to the second uplink control information.

Optionally, the third uplink control information includes the fifth uplink control information, and the method further includes:

receiving, by the base station, the fourth uplink control information on a time domain resource that does not include the overlapping time domain resource and that is in the time domain resource corresponding to the first uplink control information.

Optionally, the third uplink control information includes the fourth uplink control information and the fifth uplink control information, and the method further includes at least one of the following steps:

receiving, by the base station, the third uplink control information on a resource that corresponds to the first uplink control information and that is in the overlapping time domain resource; and receiving, by the base station, the third uplink control information on a resource that corresponds to the second uplink control information and that is in the overlapping time domain resource.

Optionally, the method further includes:

sending, by the base station, indication information to user equipment, where the indication information includes at least one of the following information:

resource allocation information of the time domain resource corresponding to the first uplink control information;

resource allocation information of the time domain resource corresponding to the second uplink control information;

indication information of the overlapping time domain resource; and indication information of the third uplink control information.

This embodiment of the present application can resolve an uplink control information transmission problem when there are a plurality of pieces of uplink control information corresponding to time domain resources of different lengths and a conflict occurs between the time domain resources corresponding to the plurality of pieces of uplink control information.

According to a fourth aspect, an uplink control information transmission method is provided. The method includes:

receiving, by a base station, first uplink control information on at least one part of a time domain resource corresponding to the first uplink control information, where the first uplink control information includes at least one of hybrid automatic repeat request information, channel state information, and scheduling request information, the time domain resource corresponding to the first uplink control information includes M preset time domain resources, and M is an integer greater than or equal to one, where the at least one part of the time domain resource corresponding to the first uplink control information includes at least one preset time domain resource, and the at least one preset time domain resource bears all information of the first uplink control information; and a length corresponding to each of the M preset time domain resources is less than six symbols.

Optionally, that the length corresponding to each of the M preset time domain resources is less than six symbols includes:

the length corresponding to each of the M preset time domain resources is one symbol;

the length corresponding to each of the M preset time domain resources is two symbols; or the length corresponding to each of the M preset time domain resources is three symbols.

Optionally, the method further includes:

receiving, by the base station, second uplink control information on a time domain resource corresponding to the second uplink control information, where the second uplink control information includes at least one of hybrid automatic repeat request information, channel state information, and scheduling request information, and a length of the time domain resource corresponding to the first uplink control information is less than a length of the time domain resource corresponding to the second uplink control information; and when the time domain resource corresponding to the first uplink control information overlaps with the time domain resource corresponding to the second uplink control information, receiving, by the base station, third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Based on the uplink control information transmission channel structure or method that is provided in this embodiment of the present application, uplink control information can still be correctly demodulated when the uplink control information is transmitted on some of a time domain resource that corresponds to the uplink control information and that is pre-allocated for the uplink control information.

According to a fifth aspect, an uplink control information transmission apparatus is provided. The apparatus includes:

a processor, configured to determine first uplink control information and second uplink control information, where a length of a time domain resource corresponding to the first uplink control information is less than a length of a time domain resource corresponding to the second uplink control information, and the first uplink control information or the second uplink control information includes at least one of hybrid automatic repeat request information, channel state information, and scheduling request information; and a transceiver, configured to: when the time domain resource corresponding to the first uplink control information overlaps with the time domain resource corresponding to the second uplink control information, transmit third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the length of the time domain resource corresponding to the first uplink control information is a first transmission time interval time length, and the length of the time domain resource corresponding to the second uplink control information is a second transmission time interval time length;

the first transmission time interval time length is less than the second transmission time interval time length; and the first transmission time interval time length is less than one millisecond.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Optionally, the third uplink control information includes the fourth uplink control information, and the transceiver is further configured to:

send the fifth uplink control information on a time domain resource that does not include the overlapping time domain resource and that is in the time domain resource corresponding to the second uplink control information.

Optionally, the third uplink control information includes the fifth uplink control information, and the transceiver is further configured to:

send the fourth uplink control information on a time domain resource that does not include the overlapping time domain resource and that is in the time domain resource corresponding to the first uplink control information.

Optionally, the third uplink control information includes the fourth uplink control information and the fifth uplink control information, and the transceiver is further configured to perform at least one of the following:

sending the third uplink control information on a resource that corresponds to the first uplink control information and that is in the overlapping time domain resource; and sending the third uplink control information on a resource that corresponds to the second uplink control information and that is in the overlapping time domain resource.

Optionally, the transceiver is further configured to receive indication information sent by a base station, where the indication information includes at least one of the following information:

resource allocation information of the time domain resource corresponding to the first uplink control information;

resource allocation information of the time domain resource corresponding to the second uplink control information;

indication information of the overlapping time domain resource; and indication information of the third uplink control information.

This embodiment of the present application can resolve an uplink control information transmission problem when there are a plurality of pieces of uplink control information corresponding to time domain resources of different lengths and a conflict occurs between the time domain resources corresponding to the plurality of pieces of uplink control information.

According to a sixth aspect, an uplink control information transmission apparatus is provided. The apparatus includes:

a processor, configured to determine first uplink control information, where a length of a time domain resource corresponding to the first uplink control information is less than one millisecond, the time domain resource corresponding to the first uplink control information includes M preset time domain resources, M is an integer greater than or equal to one, and the first uplink control information includes at least one of hybrid automatic repeat request information, channel state information, and scheduling request information; and a transceiver, configured to send all information of the first uplink control information on each of the M preset time domain resources, where a length corresponding to each of the M preset time domain resources is less than six symbols.

Optionally, that the length corresponding to each of the M preset time domain resources is less than six symbols includes:

the length corresponding to each of the M preset time domain resources is one symbol;

the length corresponding to each of the M preset time domain resources is two symbols; or the length corresponding to each of the M preset time domain resources is three symbols.

Optionally, the processor is further configured to determine second uplink control information, where the second uplink control information includes at least one of hybrid automatic repeat request information, channel state information, and scheduling request information;

the transceiver is further configured to send the second uplink control information on a time domain resource corresponding to the second uplink control information, where the length of the time domain resource corresponding to the first uplink control information is less than a length of the time domain resource corresponding to the second uplink control information; and the transceiver is further configured to: when the time domain resource corresponding to the first uplink control information overlaps with the time domain resource corresponding to the second uplink control information, transmit third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Based on the uplink control information transmission channel structure or method that is provided in this embodiment of the present application, uplink control information can still be correctly demodulated when the uplink control information is transmitted on some of a time domain resource that corresponds to the uplink control information and that is pre-allocated for the uplink control information.

According to a seventh aspect, an uplink control information transmission apparatus is provided. The apparatus includes:

a transceiver, configured to receive first uplink control information on a time domain resource corresponding to the first uplink control information, and receive second uplink control information on a time domain resource corresponding to the second uplink control information; and a processor, configured to demodulate the first uplink control information and the second uplink control information, where a length of the time domain resource corresponding to the first uplink control information is less than a length of the time domain resource corresponding to the second uplink control information, and the first uplink control information or the second uplink control information includes at least one of hybrid automatic repeat request information, channel state information, and scheduling request information; and when the time domain resource corresponding to the first uplink control information overlaps with the time domain resource corresponding to the second uplink control information, the transceiver is further configured to receive third uplink control information on the overlapping time domain resource; and the processor is further configured to demodulate the third uplink control information, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the length of the time domain resource corresponding to the first uplink control information is a first transmission time interval time length, and the length of the time domain resource corresponding to the second uplink control information is a second transmission time interval time length;

the first transmission time interval time length is less than the second transmission time interval time length; and the first transmission time interval time length is less than one millisecond.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Optionally, the third uplink control information includes the fourth uplink control information, and the transceiver is further configured to:

receive the fifth uplink control information on a time domain resource that does not include the overlapping time domain resource and that is in the time domain resource corresponding to the second uplink control information; and the processor is further configured to demodulate the fifth uplink control information.

Optionally, the third uplink control information includes the fifth uplink control information, and the transceiver is further configured to:

receive the fourth uplink control information on a time domain resource that does not include the overlapping time domain resource and that is in the time domain resource corresponding to the first uplink control information; and the processor is further configured to demodulate the fourth uplink control information.

Optionally, the third uplink control information includes the fourth uplink control information and the fifth uplink control information, and the method transceiver is further configured to perform at least one of the following:

receiving the third uplink control information on a resource that corresponds to the first uplink control information and that is in the overlapping time domain resource; and receiving the third uplink control information on a resource that corresponds to the second uplink control information and that is in the overlapping time domain resource.

Optionally, the transceiver is further configured to send indication information to user equipment, where the indication information includes at least one of the following information:

resource allocation information of the time domain resource corresponding to the first uplink control information;

resource allocation information of the time domain resource corresponding to the second uplink control information;

indication information of the overlapping time domain resource; and indication information of the third uplink control information.

This embodiment of the present application can resolve an uplink control information transmission problem when there are a plurality of pieces of uplink control information corresponding to time domain resources of different lengths and a conflict occurs between the time domain resources corresponding to the plurality of pieces of uplink control information.

According to an eighth aspect, an uplink control information transmission apparatus is provided. The apparatus includes:

a transceiver, configured to receive first uplink control information on at least one part of a time domain resource corresponding to the first uplink control information; and a processor, configured to demodulate the first uplink control information, where the first uplink control information includes at least one of hybrid automatic repeat request information, channel state information, and scheduling request information, the time domain resource corresponding to the first uplink control information includes M preset time domain resources, and M is an integer greater than or equal to one, where the at least one part of the time domain resource corresponding to the first uplink control information includes at least one preset time domain resource, and the at least one preset time domain resource includes all information of the first uplink control information; and a length corresponding to each of the M preset time domain resources is less than six symbols.

Optionally, that the length corresponding to each of the M preset time domain resources is less than six symbols includes:

the length corresponding to each of the M preset time domain resources is one symbol;

the length corresponding to each of the M preset time domain resources is two symbols; or the length corresponding to each of the M preset time domain resources is three symbols.

Optionally, the transceiver is further configured to:

receive second uplink control information on a time domain resource corresponding to the second uplink control information, where the second uplink control information includes at least one of hybrid automatic repeat request information, channel state information, and scheduling request information, and a length of the time domain resource corresponding to the first uplink control information is less than a length of the time domain resource corresponding to the second uplink control information;

the processor is further configured to demodulate the second uplink control information;

when the time domain resource corresponding to the first uplink control information overlaps with the time domain resource corresponding to the second uplink control information, the transceiver is further configured to receive third uplink control information on the overlapping time domain resource; and the processor is further configured to demodulate the third uplink control information, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Based on the uplink control information transmission channel structure or method that is provided in this embodiment of the present application, uplink control information can still be correctly demodulated when the uplink control information is transmitted on some of a time domain resource that corresponds to the uplink control information and that is pre-allocated for the uplink control information.

The embodiments of the present application provide an uplink control information transmission method and apparatus. When there are at least two pieces of uplink control information corresponding to time domain resources of different lengths and the time domain resources corresponding to the at least two pieces of uplink control information overlap, some or all of only one of the at least two pieces of uplink control information is transmitted, or some or all of each of two pieces of uplink control information is transmitted by using a multiplexing method, so as to ensure that uplink control information of a higher priority is transmitted, or ensure demodulation performance of uplink control information of a higher priority. The present application can resolve an uplink control information transmission problem when there are a plurality of pieces of uplink control information corresponding to time domain resources of different lengths and a conflict occurs between the time domain resources corresponding to the plurality of pieces of uplink control information, thereby improving transmission efficiency.

It should be understood that, the above general descriptions and the following detailed descriptions are merely examples, and are not intended to limit the protection scope of the present application.

Figure 1:
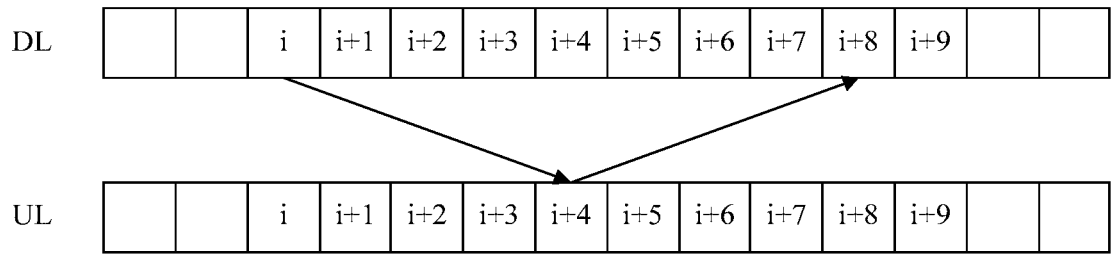
FIG. 1 is a diagram of an RTT delay of data transmission of a base station in the prior art.
Figure 2:
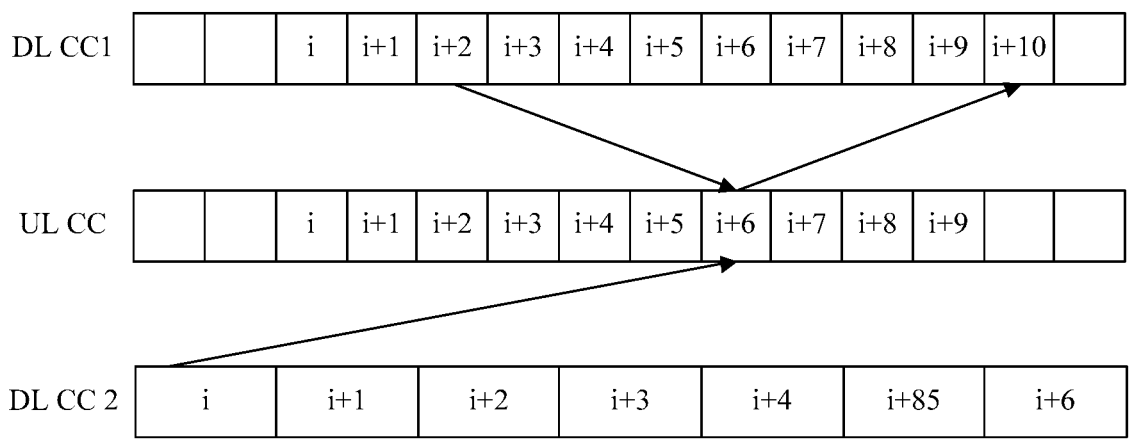
FIG. 2 is a diagram of an RTT delay of data transmission corresponding to carriers of different TTI lengths.

The foregoing accompanying drawings show specific embodiments of the present invention, and more detailed descriptions are provided in the following. The accompanying drawings and text descriptions are not intended to limit the scope of the idea of the present invention in any manner, but are intended to describe the concept of the present invention to a person skilled in the art with reference to particular embodiments.

DESCRIPTION OF EMBODIMENTS

The embodiments of the present application provide an uplink control information transmission method and apparatus, so as to resolve an uplink control information transmission problem when there are a plurality of pieces of uplink control information corresponding to time domain resources of different lengths and a conflict occurs between the time domain resources corresponding to the plurality of pieces of uplink control information.

An application environment of the embodiments of the present application is briefly described below, an LTE system or an LTE-A system is used as an example, but the application environment of the embodiments of the present application is not limited to an LTE related system, and solutions provided in the embodiments of the present application may be used for any wireless communications system that performs data transmission in a scheduling manner.

It may be understood that, in the LTE or LTE-A system, from the perspective of a time dimension, a time length of a radio frame is 10 ms, a time length of a subframe is 1 ms, and one radio frame includes ten subframes. Specifically, there are two subframe formats: One subframe format is a normal cyclic prefix (Normal Cyclic Prefix, NCP) subframe format, and an NCP subframe includes 14 OFDM symbols or two timeslots; and OFDM symbols are numbered from 0 to 13, OFDM symbols from No. 0 to No. 6 are odd timeslots, and OFDM symbols from No. 7 to No. 13 are even timeslots. The other subframe format is an extended cyclic prefix (Extended Cyclic Prefix, ECP) subframe format, and an ECP subframe includes 12 OFDM symbols or two timeslots; and OFDM symbols are numbered from 0 to 11, OFDM symbols from No. 0 to No. 5 are odd timeslots, and OFDM symbols from No. 6 to No. 11 are even timeslots.

From the perspective of a frequency dimension, a minimum unit is a subcarrier. From the perspective of a two-dimensional time-frequency joint, for a resource used for transmission of an antenna port, a minimum unit is a resource element (Resource Element, RE), and one RE includes one OFDM symbol in time domain, and includes one subcarrier in frequency domain. One resource-element group (Resource-Element Group, REG) may include an integer quantity of REs. For example, one REG may include four or 16 REs. One physical resource block (Physical Resource Block, PRB) includes one timeslot in time domain, and includes 12 subcarriers in frequency domain; and one subframe includes one PRB pair (PRB pair). One resource block (Resource Block, RB) includes one subframe in time domain, and includes 12 subcarriers in frequency domain. One resource block group (Resource Block Group, RBG) may include an integer quantity of PRBs. For example, one RBG may include one PRB, two PRBs, three PRBs, four PRBs, or another integer quantity of PRBs.

An uplink symbol is referred to as a Single Carrier-Frequency Division Multiple Access (Single Carrier-Frequency Division Multiple Access, SC-FDMA for short) symbol, and a downlink symbol is referred to as an orthogonal frequency division multiplexing (Orthogonal Frequency Division Multiplexing, OFDM for short) symbol. If an Orthogonal Frequency Division Multiple Access (Orthogonal Frequency Division Multiple Access, OFDMA) uplink multiple access manner is introduced in a subsequent technology, an uplink symbol may also be referred to as an OFDM symbol. In the embodiments of the present application, both an uplink symbol and a downlink symbol are collectively referred to as a symbol. A symbol includes a cyclic prefix (Cyclic Prefix, CP) part and an information segment part, where the information segment part includes all information about the symbol; and the CP is repetition of a signal of a part of the information segment. The symbol mentioned in the technical solutions of the embodiments of the present application may also be another type of symbol for communication, and is not limited in the present application.

A physical channel (physical channel) is specifically used for data information and/or control information transmission. In the embodiments of the present application, a physical channel includes one of or a combination of the following: a PUSCH (physical uplink shared channel, PUSCH, physical uplink shared channel), a PUCCH (physical uplink control channel, physical uplink control channel), a PDCCH (Physical Downlink Control Channel, physical downlink control channel), an EPDCCH (Enhanced-Physical Downlink Control Channel, enhanced-physical downlink control channel), a PCFICH (Physical Control Format Indicator Channel, physical control format indicator channel), a PHICH (Physical hybrid ARQ indicator channel, physical hybrid automatic repeat request indicator channel), a PDSCH (Physical Downlink Shared Channel, physical downlink shared channel), and the like, or channels that have a same function but have different names and that are newly introduced in a standard, for example, a control channel or a data channel introduced in short TTI transmission.

Short TTI data transmission is data transmission whose TTI is less than one subframe or 1 ms. For example, a TTI length is 0.5 ms, a TTI length is one of one symbol, two symbols, three symbols, four symbols, five symbols, and six symbols, or a TTI length is a combination of at least two different TTI lengths of one symbol, two symbols, three symbols, four symbols, five symbols, six symbols, and seven symbols. For example, 1 ms includes four TTIs whose lengths are respectively four symbols, three symbols, four symbols, and three symbols, or three symbols, four symbols, three symbols, and four symbols, or a combination of other different TTI lengths. For convenience of description, for a case in which 1 ms includes four TTIs, unless specially described, in descriptions in the embodiments of the present application, a TTI length is 0.25 ms. Likewise, a packet whose TTI is less than one subframe or 1 ms is referred to as a short TTI packet. The short TTI data transmission may be in continuous distribution or discontinuous distribution in frequency domain. It should be noted that, in consideration of backward compatibility, 1-ms TTI transmission and short TTI transmission may coexist in a system.

Figure 3:
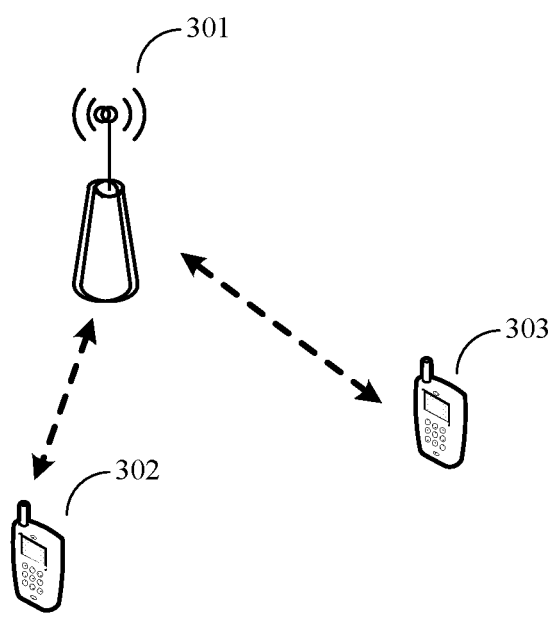
FIG. 3 is a schematic diagram of an application scenario according to an embodiment of the present invention.

FIG. 3 shows an application scenario applicable to the solutions that are provided in the embodiments of the present application. The scenario includes a cell base station 301, and user equipment 302 and user equipment 303 that are in coverage of the cell base station 301 and that communicate with the cell base station 301. The cell base station 301 is a base station of an LTE system, the user equipment 302 and the user equipment 303 are user equipments corresponding to the LTE system, both the cell base station 301 and the user equipment 302 are devices supporting short TTI transmission, and the user equipment 303 is a device not supporting short TTI transmission. The cell base station 301 may communicate with the user equipment 302 separately by using a short TTI or a normal 1-ms TTI. The cell base station 301 may communicate with the user equipment 303 by using a normal 1-ms TTI.

In the embodiments of the present application, user equipment (User Equipment, UE) may be referred to as a terminal (Terminal), a mobile station (Mobile Station, MS), a mobile terminal (Mobile Terminal), and the like. The user equipment may communicate with one or more core networks by using a radio access network (Radio Access Network, RAN). For example, the user equipment may be a mobile phone (or referred to as a "cellular" phone) or a computer with a mobile terminal. For example, the user equipment may also be a portable, pocket-sized, handheld, computer built-in, or in-vehicle mobile apparatus, which exchanges voice and/or data with the radio access network.

In the embodiments of the present application, a base station may be an evolved Node B (Evolutional Node B, eNB or e-NodeB for short), a macro base station, a micro base station (also referred to as a "small cell"), a picocell base station, an access point (Access Point, AP), or a transmission point (Transmission Point, TP) in an LTE system or an LAA-LTE system, or another network side device. This is not limited in the present application.

In the LTE system, a carrier aggregation technology is supported, that is, the base station configures a plurality of carriers for one UE to improve a data rate of the UE. The UE supporting the carrier aggregation technology may simultaneously detect downlink data on a plurality of downlink carriers, and the UE needs to simultaneously make a HARQ feedback mechanism for the downlink data on the plurality of downlink carriers. Therefore, it requires that one uplink channel can support transmission of uplink HARQ-ACK information corresponding to downlink data on a plurality of downlink carriers. In addition, to enable the base station to schedule the UE and transmit the downlink data on the plurality of downlink carriers, the UE needs to feed back channel state information CSI (Channel State Information, CSI) on the carriers to the base station. The CSI information fed back by the UE to the base station is divided into periodic CSI information and aperiodic CSI information. For periodic CSI, a feedback period of each downlink carrier is independently configured, and when periodic CSI of a plurality of downlink component carriers needs to be simultaneously fed back, the UE feeds back only periodic CSI that has a highest priority and that is of a component carrier. For periodic CSI that is of a plurality of downlink component carriers and that has a same priority, periodic CSI of a component carrier whose downlink component carrier index is minimum is fed back. For aperiodic CSI, a control bit in dynamic downlink control information DCI is used to trigger aperiodic CSI. In a particular uplink TTI, the UE may need to simultaneously feed back uplink HARQ-ACK feedback information for downlink scheduling data and the CSI information on the plurality of carriers to the base station. The UE may further send scheduling request (Scheduling Request, SR) information to the base station, to request an uplink UL-SCH resource from the base station. It should be noted that, all of uplink HARQ-ACK information corresponding to a downlink transmission data block, CSI feedback information that is obtained by measuring a downlink channel state, and the scheduling request SR information that is sent by the UE are uplink control information (Uplink Control Information, UCI). The CSI feedback information may include at least one of CQI (Channel Quality Indicator, channel quality indicator) information, PMI (Precoding Matrix Indicator, precoding matrix indicator) information, and RI (Rank Indicator, rank indicator) information. UCI may be borne on a PUCCH, or may be borne on a PUSCH. In the embodiments of the present application, a case in which UCI is borne on a PUCCH is mainly considered.

In the LTE system, the base station usually configures a PUCCH channel resource and a PUCCH format for the UE, and the PUCCH channel resource is used by the UE to transmit UCI. One PUCCH channel resource corresponds to one PUCCH format, and the UE transmits uplink control information based on the corresponding PUCCH format on the PUCCH channel resource. In the LTE system, several different PUCCH formats are defined, and the several different PUCCH formats are briefly described below. It should be noted that, all of these PUCCH formats are PUCCH formats in which lengths are 1 ms.

PUCCH Format 1:

One RB is occupied, only SR information is carried, and no radio resource is occupied. The UE needs to send an SR only at the time of requesting an uplink resource; and at other time, the UE sends no SR to save power and reduce interference. Therefore, different from HARQ-ACK information, there is no explicit bit used to send an SR, and instead, whether an SR exists is indicated based on whether energy exists on a corresponding PUCCH. A channel resource in the PUCCH format 1 is configured for the UE by using high layer signaling.

PUCCH Format 1a:

One RB is occupied, only HARQ-ACK information of one bit is transmitted, binary phase shift keying (Binary Phase Shift Keying, BPSK) modulation is used, and the PUCCH format 1a corresponds to a scenario of a single cell and a single code word. If an SR also needs to be sent, SR information may be further carried. A channel resource in the PUCCH format 1a is implicitly notified to the UE by using indication information of a first control channel element (Control Channel Element, CCE) of a PDCCH for scheduling downlink data transmission.

PUCCH Format 1b:

One RB is occupied, HARQ-ACK information of two bits is transmitted, quadrature phase shift keying (Quadrature Phase Shift Keying, QPSK) modulation is used, and the PUCCH format 1b corresponds to a scenario of a single cell and double code words. If an SR also needs to be sent, SR information may be further carried. A channel resource in the PUCCH format 1b is implicitly notified to the UE by using indication information of a first CCE of a PDCCH for scheduling downlink data transmission.

PUCCH Format 2:

One RB is occupied. For a normal CP subframe format, only CSI information of 20 bits after encoding is carried. For a long CP subframe format, CSI information of 20 bits is carried, and HARQ-ACK information of one bit or two bits may be further carried. The QPSK modulation is used in both of the two.

PUCCH Format 2a:

One RB is occupied, and CSI information and HARQ-ACK information are transmitted. Only the normal CP subframe format is supported, CSI information of 20 bits after encoding and HARQ-ACK information of one bit are carried, and the PUCCH format 2a corresponds to a scenario of a single cell and a single code word. The QPSK modulation is used for the CSI information, and the BPSK modulation is used for the HARQ-ACK information.

PUCCH Format 2b:

One RB is occupied, and CSI information and HARQ-ACK information are transmitted. Only the normal CP subframe format is also supported, CSI information of 20 bits after encoding and HARQ-ACK information of two bits are carried, and the PUCCH format 2b corresponds to a scenario of a single cell and double code words. The QPSK modulation is used for both of the CSI information and the HARQ-ACK information.

A channel resource in the PUCCH format 2/2a/2b is configured for the UE by using high layer signaling. Assuming that the PUCCH format 2 is configured for the UE, when the UE transmits only CSI information, the PUCCH format 2 is used; and when the UE needs to transmit both the CSI information and the HARQ-ACK information, the PUCCH format 2a or 2b is used in the normal CP subframe format, and the PUCCH format 2 is used in the long CP subframe format.

PUCCH Format 3:

One RB is occupied, information of 48 bits after encoding is carried, at most five serving cells can be supported, and the UE sends HARQ-ACK in a scenario in which MIMO is configured for each serving cell. When an SR also needs to be transmitted, the PUCCH format 3 can also support both transmission of the HARQ-ACK and transmission of the SR. Moreover, if capacity permits, CSI information of at most one carrier is transmitted. Among channel resources of the PUCCH format 3, four possible channel resources are configured for the UE by using high layer signaling, and then one of the four channel resources that is specifically used by the UE is indicated by using dynamic signaling.

PUCCH Format 4:

The PUCCH format 4 is a PUSCH-based PUCCH format, and a PUCCH channel resource occupies N (1≤n≤8) RBs. Among channel resources of the PUCCH format 4, four possible channel resources are configured for the UE by using high layer signaling, and then one of the four channel resources that is specifically used by the UE is indicated by using dynamic signaling.

PUCCH Format 5:

The PUCCH format 5 is a PUSCH-based PUCCH format, a PUCCH channel resource occupies one RB, and code division multiplexing of two users is allowed. Among channel resources of the PUCCH format 5, four possible channel resources are configured for the UE by using high layer signaling, and then one of the four channel resources that is specifically used by the UE is indicated by using dynamic signaling.

In a conventional LTE system, channel structures of PUCCHs in different formats are different. For a same PUCCH channel structure, a PUCCH of a 1-ms TTI length includes two timeslots, transmission is performed in an inter-timeslot frequency hopping manner, and a channel structure in each timeslot is completely the same. Specifically, using odd timeslots in the normal CP subframe format as an example, a channel structure in the PUCCH format 1 or 1a or 1b is: a symbol 0, a symbol 1, a symbol 5, and a symbol 6 are used to transmit an information bit, and are spread by using an orthogonal cover code (Orthogonal Cover Code, OCC) whose sequence length is 4; and a symbol 2, a symbol 3, and a symbol 4 are used to transmit a reference signal, and are spread by using an OCC whose sequence length is 3. A channel structure in the PUCCH format 2 is: a symbol 1 and a symbol 5 are used to transmit a reference signal, and remaining five symbols are used to transmit an information bit, where 12 subcarriers on a same symbol bear the same content, different symbols in a same timeslot bear different content, and different symbols in different timeslots also bear different content. For the PUCCH format 2a or 2b, based on the channel structure in the PUCCH format 2, HARQ-ACK information is modulated on a symbol 5 used to transmit a reference signal. A channel structure in the PUCCH format 3 and the channel structure in the PUCCH format 2 are the same in: a symbol 1 and a symbol 5 are used to transmit a reference signal and remaining five symbols are used to transmit an information bit; and are different in: in the format 3, 12 subcarriers on a same symbol in a timeslot bear different content, different symbols in a same timeslot bear the same content, but are spread in time domain using an OCC whose sequence length is 5, so that the format 3 has a different representation form, and different timeslots bear different content. A channel structure of the PUCCH format 4 or 5 is the same as that of a PUSCH of a 1-ms TTI, and an intermediate symbol of each PRB is a demodulation reference signal. After being subject to channel encoding and modulation, an original information bit is mapped to another location other than the demodulation reference signal, and the original bit information in the format may be encoded by using a convolutional code such as a tail biting convolutional code (Tail Biting Convolutional Code, TBCC).

It should be noted that, each conventional PUCCH format is based on a 1-ms TTI. If short TTI transmission is introduced in uplink, a new uplink control channel supporting the short TTI transmission is needed correspondingly, for example, a short PUCCH channel structure or a new PUCCH format.

After the short TTI transmission is introduced, the UE may support receiving downlink data of a plurality of different TTI lengths, where a complete transmission data block that can be independently demodulated may be transmitted in each TTI. The UE may also support sending uplink data of a plurality of different TTI lengths. A TTI length of downlink transmission may be the same as that of uplink transmission corresponding to the downlink transmission. For example, both a TTI length of downlink transmission and a TTI length of uplink transmission corresponding to the downlink transmission are 0.25 ms. A TTI length of downlink transmission may be less than a TTI length of uplink transmission corresponding to the downlink transmission. For example, a TTI length of downlink transmission is two symbols, and a TTI length of uplink transmission is three symbols. A TTI length of downlink transmission may be further greater than a TTI length of uplink transmission corresponding to the downlink transmission. For example, a TTI length of downlink transmission is 0.25 ms, and a TTI length of uplink transmission is one symbol. It should be noted that, a plurality of downlink transmission data blocks corresponding to different TTI lengths may be from a same carrier or may be from different carriers. When the UE has a plurality of downlink carriers, the UE further needs to feed back CSI information on different carriers. After a TTI is shortened, a corresponding HARQ processing delay is also shortened. It may be considered that the HARQ processing delay is shortened in equal proportion, that is, short TTI data transmission still follows a HARQ feedback delay equal to a fourfold TTI length, or it may be considered that short TTI data transmission follows a HARQ feedback delay greater than a fourfold TTI length or a HARQ feedback delay less than a fourfold TTI length. This is not limited in the present application. However, regardless of any situation, a scenario in which the UE needs to feed back at least two pieces of uplink control information to the base station at the same time in uplink may occur, and consequently a conflict may occur in uplink control information transmission. The problem is described in detail below. For convenience of description, an example in which the UE feeds back corresponding uplink HARQ-ACK information for downlink carriers of different TTI lengths in a carrier aggregation scenario is used for description. In the example, short TTI data transmission follows a HARQ feedback delay of a fourfold TTI length, and it is assumed that a TTI length of uplink transmission is the same as a TTI length of downlink transmission corresponding to the uplink transmission.

Figure 4:
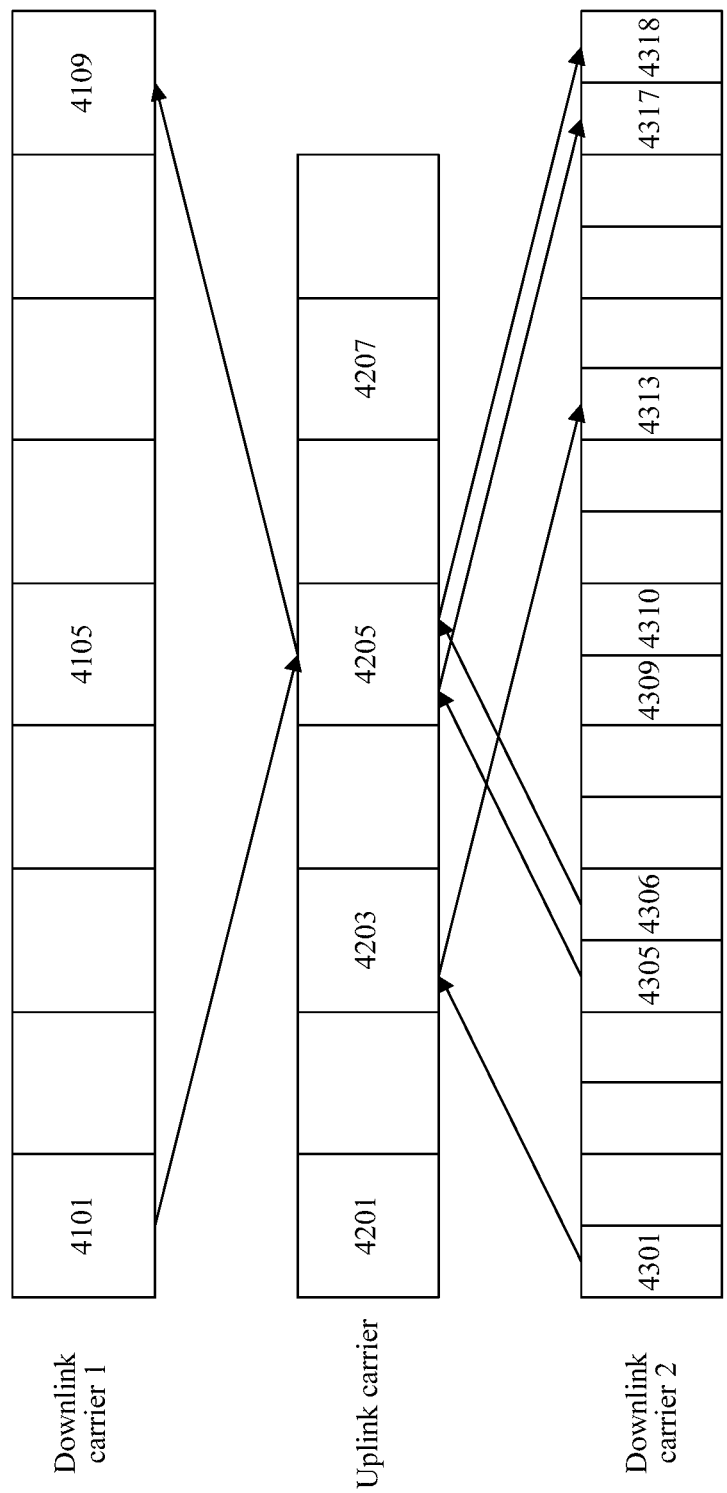
FIG. 4 a schematic diagram showing that a conflict is generated in uplink control information fed back on an uplink carrier.

As shown in FIG. 4, the UE supports receiving data on two downlink carriers and sending data on one uplink carrier, where the two downlink carriers are respectively a downlink carrier 1 and a downlink carrier 2. A TTI length of the downlink carrier 1 and a TTI length of the uplink carrier are greater than a TTI length of the downlink carrier 2, and the TTI length of the downlink carrier 1 is equal to the TTI length of the uplink carrier. It is assumed that a time length of one TTI of the downlink carrier 1 is equal to a time length of N TTIs of the downlink carrier 2. That is, if a time length of a TTI of the downlink carrier 2 is L2, a time length of a TTI of the downlink carrier 1 is: L1=N*L2. In an embodiment shown in FIG. 4, L1=2*L2.

In FIG. 4, each cuboid represents a TTI of corresponding uplink data or downlink data, that is, 4101 is a TTI of the downlink carrier 1, 4201 is a TTI of the uplink carrier, and 4301 is a TTI of the downlink carrier 2. As shown in FIG. 4, a time length of the TTI of 4101 is equal to a time length of the TTI of 4201, and the time length of the TTI of the 4101 is equal to twofold the time length of the TTI of 4301.

The time length of the TTI of the downlink carrier 1 is equal to that of the TTI of the uplink carrier. Therefore, HARQ-ACK information corresponding to data in a $k^{th}$ TTI of the downlink carrier 1 is fed back in a TTI of the uplink carrier corresponding to a $(k+4)^{th}$ TTI of the downlink carrier 1, and the downlink carrier 1 retransmits data or initially transmits data in a $(k+8)^{th}$ TTI. For example, HARQ-ACK information corresponding to data in 4101 is fed back in 4205 corresponding to 4105, and data is retransmitted or data is initially transmitted in 4109.

The time length of the TTI of the uplink carrier is twofold the time length of the TTI of the downlink carrier 2, and HARQ-ACK information corresponding to data in a $k^{th}$ TTI of the downlink carrier 2 should be fed back in the TTI of the uplink carrier corresponding to a $(k+4)^{th}$ TTI of the downlink carrier 2. For example, for HARQ-ACK information corresponding to data in 4301, uplink control information should be fed back in a former half part of 4203 corresponding to 4305 in a HARQ time sequence, and for data in 4306, uplink control information should be fed back in a latter half part of 4205 in a HARQ time sequence.

In the embodiment shown in FIG. 4, a conflict may be generated in feedback information on the uplink carrier, and conflict types may include:

Conflict type 1) If data of the UE is transmitted in both 4101 of the downlink carrier 1 and 4305 of the downlink carrier 2, a conflict is generated in control information fed back by the UE in 4205 of the uplink carrier; or if data is transmitted in both 4101 of the downlink carrier 1 and 4306 of the downlink carrier 2, a conflict is generated in control information fed back in 4205 of the uplink carrier.

Conflict type 2) If data of the UE is transmitted in all of 4101 of the downlink carrier 1, 4305 of the downlink carrier 2, and 4306 of the downlink carrier 2, a conflict is generated in control information fed back by the UE in 4205 of the uplink carrier.

Figure 5:
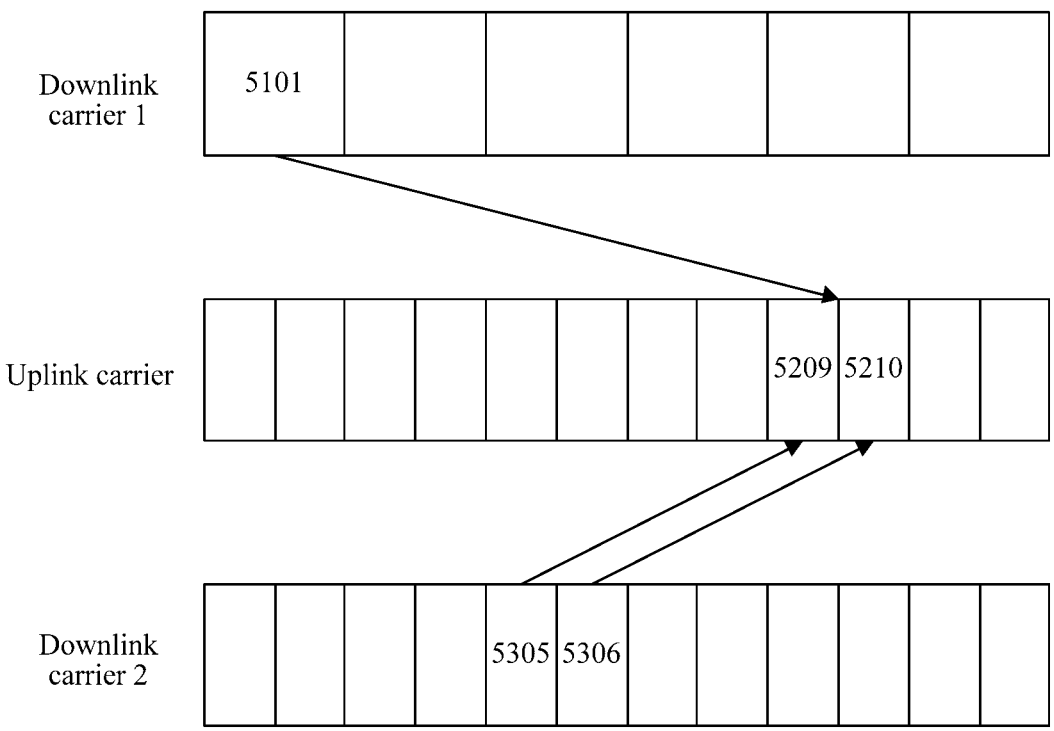
FIG. 5 a schematic diagram showing that a conflict is generated in uplink control information fed back on an uplink carrier.

FIG. 5 shows an uplink carrier in a schematic diagram showing that a conflict is generated in control information fed back on an uplink carrier. A scenario shown in FIG. 5 includes one uplink carrier and two downlink carriers, and the two downlink carriers are respectively a downlink carrier 1 and a downlink carrier 2. A TTI length of the downlink carrier 1 is greater than a TTI length of the uplink carrier and a TTI length of the downlink carrier 2, a time length of a TTI of the downlink carrier 1 is twofold a time length of a TTI of the downlink carrier 2, and the time length of the TTI of the downlink carrier 2 is equal to a time length of a TTI of the uplink carrier.

HARQ-ACK information corresponding to data transmitted in 5101 of the downlink carrier 1 is fed back in 5209 and 5210 of the uplink carrier; and HARQ-ACK information corresponding to data transmitted in 5305 of the downlink carrier 2 is fed back in 5209, and HARQ-ACK information corresponding to data transmitted in 5306 of the downlink carrier 2 is fed back in 5210.

In the scenario shown in FIG. 5, a conflict may be generated in control information fed back on the uplink carrier, and conflict types may include:

Conflict type 3) If data of the UE is transmitted in both 5101 of the downlink carrier 1 and 5305 of the downlink carrier 2, a conflict is generated in control information fed back by the UE in 5209 of the uplink carrier; or if data is transmitted in both 5101 of the downlink carrier 1 and 5306 of the downlink carrier 2, a conflict is generated in control information fed back in 5210 of the uplink carrier.

Conflict type 4) If data of the UE is transmitted in all of 5101 of the downlink carrier 1, 5305 of the downlink carrier 2, and 5306 of the downlink carrier 2, a conflict is generated in the UE in both 5209 and 5210 of the uplink carrier.

If a time length of a shortest TTI of the foregoing TTIs of different lengths is used as a time length unit, actually, the conflict types 1) and 3) are the same, and the conflict types 2) and 4) are the same. For convenience of description, the conflict 1) and the conflict 2) are used to represent two conflict types below.

The embodiments of the present application provide specific solutions for the foregoing conflict types, and the embodiments of the present application are described in detail below with reference to accompanying drawings.

Embodiment 1

Figure 6:
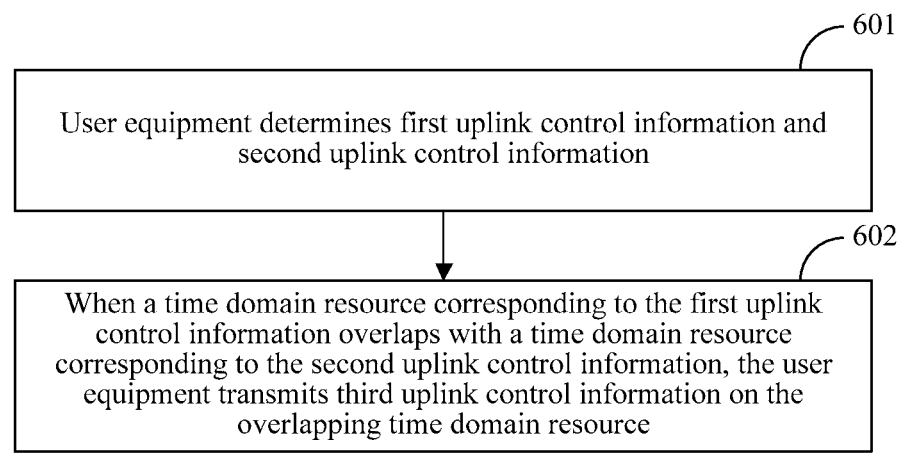
FIG. 6 is a flowchart of an uplink control information transmission method according to an embodiment of the present invention.

Referring to FIG. 6, FIG. 6 is a flowchart of an uplink control information transmission method according to an embodiment of the present application. As shown in FIG. 6, the method includes the following steps.

Step 601. User equipment determines first uplink control information and second uplink control information.

A length of a time domain resource corresponding to the first uplink control information is less than a length of a time domain resource corresponding to the second uplink control information.

The first uplink control information includes at least one of hybrid automatic repeat request (HARQ-ACK) information, channel state information (CSI), and scheduling request (SR) information, and the second uplink control information includes at least one of hybrid automatic repeat request information, channel state information, and scheduling request information.

It should be noted that, the channel state information includes at least one of CQI information, PMI information, and RI information.

It should be noted that, a time sequence in which the user equipment determines the first uplink control information and the second uplink control information is not limited in step 601. The user equipment may first determine the first uplink control information, and then determine the second uplink control information; the user equipment may first determine the second uplink control information, and then determine the first uplink control information; or the user equipment may simultaneously determine the first uplink control information and the second uplink control information.

In the process of specifically implementing step 601, optionally, a length of a time domain resource corresponding to uplink control information is a length of a PUCCH corresponding to the uplink control information. Optionally, the length of the time domain resource corresponding to the first uplink control information is a first transmission time interval TTI time length, and the length of the time domain resource corresponding to the second uplink control information is a second transmission time interval TTI time length, where the first TTI time length is less than the second TTI time length, and the first TTI time length is less than one millisecond. Optionally, the length of the time domain resource corresponding to the second uplink control information is 1 ms, and the length of the time domain resource corresponding to the first uplink control information is 0.5 ms, 0.25 ms, four symbols, three symbols, two symbols, or one symbol; or both the length of the time domain resource corresponding to the second uplink control information and the length of the time domain resource corresponding to the first uplink control information are less than 1 ms. For example, the length of the time domain resource corresponding to the second uplink control information is 0.5 ms, and the length of the time domain resource corresponding to the first uplink control information is 0.25 ms, four symbols, three symbols, two symbols, or one symbol.

In the process of specifically implementing step 601, optionally, a base station allocates the time domain resource corresponding to the first uplink control information and/or the time domain resource corresponding to the second uplink control information to the user equipment. Further, optionally, the base station notifies the user equipment of resource allocation information of the time domain resource corresponding to the first uplink control information and/or resource allocation information of the time domain resource corresponding to the second uplink control information in a manner such as by using RRC signaling, MAC signaling, or physical layer signaling. Further, optionally, the RRC signaling, MAC signaling, or physical layer signaling may be borne on a current carrier, or may be borne on a non-current carrier. Optionally, the user equipment may further determine the time domain resource corresponding to the first uplink control information and/or the time domain resource corresponding to the second uplink control information in a predefined manner.

In the process of specifically implementing step 601, optionally, the user equipment receives indication information sent by the base station, where the indication information includes the resource allocation information of the time domain resource corresponding to the first uplink control information and/or the resource allocation information of the time domain resource corresponding to the second uplink control information. It should be noted that, resource allocation information of a time domain resource corresponding to uplink control information may be indication information of a length of the time domain resource corresponding to the uplink control information, may be indication information of a TTI length of a PUCCH corresponding to the uplink control information, may be indication information of a PUCCH channel resource corresponding to the uplink control information, or may be resource allocation information that corresponds to the uplink control information and that includes a time domain resource indicator, and/or a frequency domain resource indicator, and/or a space domain resource indicator, and/or a code resource indicator.

It should be noted that, in step 601, a time domain resource corresponding to uplink control information is a time domain resource that is used to transmit the uplink control information and that is pre-allocated to the user equipment, and a time domain resource used during actual transmission of the uplink control information is unnecessarily all of the pre-allocated time domain resource corresponding to the uplink control information. In the prior art, a length of a time domain resource corresponding to uplink control information is fixed to be 1 ms, and after short TTI transmission is introduced, the length of the time domain resource corresponding to the uplink control information may be less than 1 ms. For example, the length is 0.5 ms, 0.25 ms, four symbols, three symbols, two symbols, or one symbol.

Step 602. When the time domain resource corresponding to the first uplink control information overlaps with the time domain resource corresponding to the second uplink control information, the user equipment transmits third uplink control information on the overlapping time domain resource.

The third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Specifically, the third uplink control information may include the following eight situations:

some information of the first uplink control information;

some information of the second uplink control information;

all information of the first uplink control information;

all information of the second uplink control information;

some information of the first uplink control information and some information of the second uplink control information;

some information of the first uplink control information and all information of the second uplink control information;

all information of the first uplink control information and some information of the second uplink control information; and all information of the first uplink control information and all information of the second uplink control information.

The third uplink control information is described in detail below.

For convenience of description, in all embodiments of the present application, "some information of uplink control information or all information of uplink control information" may also be described as "some information or all information of uplink control information" or "some or all of uplink control information", and the three indicate a same meaning. Likewise, "some information of uplink control information" and "some of uplink control information"

indicate a same meaning, and "all information of uplink control information" and "all of uplink control information" indicate a same meaning.

In the process of specifically implementing step 602, optionally, the user equipment determines that the time domain resource corresponding to the first uplink control information overlaps with the time domain resource corresponding to the second uplink control information. Optionally, a manner in which the time domain resource corresponding to the first uplink control information overlaps with the time domain resource corresponding to the second uplink control information may be that the time domain resource corresponding to the second uplink control information includes all or some of the time domain resource corresponding to the first uplink control information. Optionally, a length of the overlapping time domain resource is less than 1 ms, for example, may be one symbol or several symbols or may be a timeslot. Optionally, the base station sends indication information of the overlapping time domain resource to the user equipment. Specifically, the indication information of the overlapping time domain resource may include at least one of the length of the overlapping time domain resource, a symbol number of the overlapping time domain resource, a timeslot number of the overlapping time domain resource, a start location of the overlapping time domain resource, an end location of the overlapping time domain resource, and the like. Further, optionally, the base station notifies the user equipment of the indication information of the overlapping time domain resource in a manner such as by using RRC signaling, MAC signaling, or physical layer signaling, the RRC signaling, MAC signaling, or physical layer signaling may be borne on a current carrier, or may be borne on a non-current carrier.

It should be noted that, a resource corresponding to uplink control information includes a time domain resource, and further includes at least one of a frequency domain resource, a code resource, a space antenna port resource, and the like. Optionally, a resource corresponding to uplink control information is a PUCCH channel resource corresponding to the uplink control information.

the foregoing overlapping means that the resource corresponding to the first uplink control information overlaps with the resource corresponding to the second uplink control information in time domain, and the resource corresponding to the first uplink control information may overlap with or may not overlap with the resource corresponding to the second uplink control information in frequency domain, and/or code domain, and/or space domain. This is not limited in this embodiment of the present application.

It should be noted that, in this embodiment of the present application, an example in which there are two pieces of uplink control information corresponding to time domain resources of different lengths and the time domain resources corresponding to the two pieces of uplink control information overlap is used for specific description. When there are more than two pieces of uplink control information corresponding to time domain resources of different lengths and the time domain resources corresponding to the more than two pieces of uplink control information overlap, a processing method is similar to that in a case in which there are two pieces of uplink control information corresponding to time domain resources of different lengths and the time domain resources corresponding to the two pieces of uplink control information overlap. Details are not described herein again.

In the process of specifically implementing step 602, optionally, the third uplink control information includes the fourth uplink control information. Optionally, the third uplink control information includes the fifth uplink control information. Optionally, the third uplink control information includes the fourth uplink control information and the fifth uplink control information.

Optionally, content of the third uplink control information is predefined. Optionally, content of the third uplink control information is determined based on the indication information that is of the third uplink control information, that is sent by the base station, and that is received by the user equipment. Optionally, a sending manner of the third uplink control information is determined based on the indication information that is of the third uplink control information, that is sent by the base station, and that is received by the user equipment. Further, optionally, the base station notifies the user equipment of the indication information of the third uplink control information in a manner such as by using RRC signaling, MAC signaling, or physical layer signaling, the RRC signaling, MAC signaling, or physical layer signaling may be borne on a current carrier, or may be borne on a non-current carrier.

In the process of specifically implementing step 602, optionally, all of the first uplink control information may be all information of the first uplink control information. Optionally, because the overlapping time domain resource may be some of the time domain resource corresponding to the first uplink control information, some of the first uplink control information may be some information of all information of the first uplink control information.

In the process of specifically implementing step 602, optionally, all of the second uplink control information may be all information of the second uplink control information. Optionally, because the overlapping time domain resource may be some of the time domain resource corresponding to the second uplink control information, some of the second uplink control information may be some information of all information of the second uplink control information.

In this embodiment of the present application, based on different content of the third uplink control information, as an option, the following several situations are specifically included.

Situation 1: The third uplink control information includes the fourth uplink control information, that is, the third uplink control information includes some or all of the first uplink control information.

That is, the user equipment does not transmit the second uplink control information on the overlapping time domain resource of the time domain resource corresponding to the first uplink control information and the time domain resource corresponding to the second uplink control information, thereby transmitting some or all of only the first uplink control information on the overlapping time domain resource.

It should be noted that, uplink control information includes at least one of hybrid automatic repeat request information, channel state information, scheduling request information, where the hybrid automatic repeat request information is answer information for a downlink packet received by the user equipment, the scheduling request information is information for requesting an uplink transmission resource from the base station, and the channel state information is information for reporting a downlink channel state of the user equipment to the base station. Usually, when the uplink control information includes at least two of the foregoing three pieces of information, it may be considered that a priority of the hybrid automatic repeat request information and/or the scheduling request information higher than that of the channel state information.

Optionally, when the first uplink control information includes at least one of the hybrid automatic repeat request information or the scheduling request information, and the channel state information, that the third uplink control information includes some of the first uplink control information may mean that the third uplink control information includes another part other than the channel state information in the first uplink control information.

Optionally, when the first uplink control information includes at least one of the hybrid automatic repeat request information or the scheduling request information and the second uplink control information includes the channel state information and does not include the hybrid automatic repeat request information and the scheduling request information, the third uplink control information includes some or all of the first uplink control information.

Figure 7:
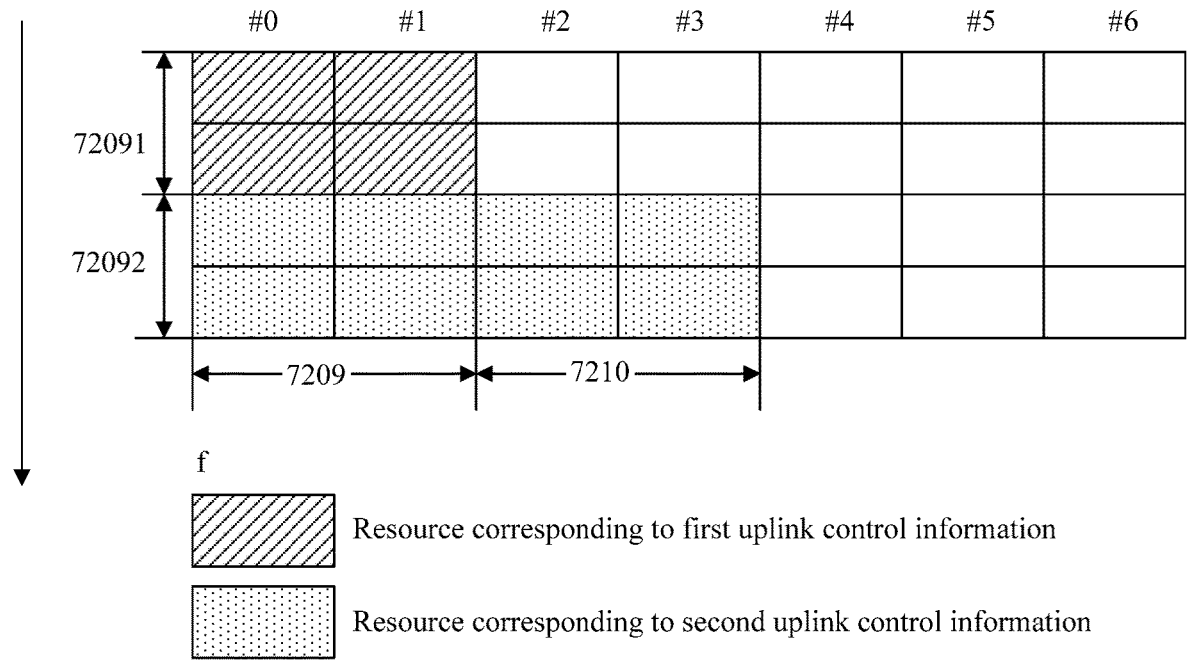
FIG. 7 is a schematic diagram showing that a time domain resource corresponding to first uplink control information overlaps with a time domain resource corresponding to second uplink control information on a same uplink carrier according to an embodiment of the present invention.

The situation 1 is specifically described below by using FIG. 7 as an example. FIG. 7 is a schematic diagram showing that a time domain resource corresponding to first uplink control information overlaps with a time domain resource corresponding to second uplink control information on a same uplink carrier according to an embodiment of the present application. As shown in FIG. 7, it is assumed that a length of the time domain resource corresponding to the first uplink control information is two symbols specifically corresponding to a symbol 0 and a symbol 1 that are used to transmit the first uplink control information; and a length of the time domain resource corresponding to the second uplink control information is four symbols specifically corresponding to symbols 0, 1, 2, and 3 that are used to transmit the second uplink control information. The time domain resource corresponding to the first uplink control information overlaps with the time domain resource corresponding to the second uplink control information on the symbol 0 and the symbol 1. The symbol 0 and the symbol 1 are indicated by using 7209, and the symbol 2 and the symbol 3 are indicated by using 7210. In the example shown in FIG. 7, the resource corresponding to the first uplink control information does not overlap with the resource corresponding to the second uplink control information in frequency domain.

The user equipment should originally transmit the first uplink control information on the resource corresponding to the first uplink control information, and transmit the second uplink control information on the resource corresponding to the second uplink control information. When the time domain resource corresponding to the first uplink control information overlaps with the time domain resource corresponding to the second uplink control information, because uplink sending of the user equipment has a single carrier characteristic and the length of the time domain resource corresponding to the second uplink control information is greater than the length of the time domain resource corresponding to the first uplink control information, the user equipment transmits some or all of the first uplink control information on the overlapping time domain resource such as the symbols indicated by 7209 in FIG. 7. Correspondingly, the user equipment transmits some or all of the second uplink control information on a time domain resource that does not include the overlapping time domain resource and that is in the time domain resource corresponding to the second uplink control information, for example, on the symbols indicated by 7210 in FIG. 7. The user equipment does not transmit the second uplink control information on the overlapping time domain resource such as the symbols indicated by 7209 in FIG. 7.

Optionally, that the user equipment transmits some or all of the first uplink control information on the overlapping time domain resource may be that the user equipment transmits some or all of the first uplink control information on a resource that corresponds to the first uplink control information and that is in the overlapping time domain resource. For example, the user equipment transmits some or all of the first uplink control information on a resource indicated by 72091 in FIG. 7.

Optionally, that the user equipment transmits some or all of the first uplink control information on the overlapping time domain resource may be that the user equipment transmits some or all of the first uplink control information on a resource that corresponds to the second uplink control information and that is in the overlapping time domain resource. For example, the user equipment transmits some or all of the first uplink control information on a resource indicated by 72092 in FIG. 7.

In FIG. 7, four rectangular frames at an upper left corner are 72091, and four rectangular frames at a lower left corner are 72092.

Situation 2: The third uplink control information includes the fifth uplink control information, that is, the third uplink control information includes some or all of the second uplink control information.

That is, the user equipment does not transmit the first uplink control information on the overlapping time domain resource of the time domain resource corresponding to the first uplink control information and the time domain resource corresponding to the second uplink control information, thereby transmitting some or all of only the second uplink control information on the overlapping time domain resource.

As described in the situation 1, usually, when the uplink control information includes at least two of three pieces of information: hybrid automatic repeat request information, scheduling request information, and channel state information, it may be considered that a priority of the hybrid automatic repeat request information and/or the scheduling request information is higher than that of the channel state information.

Optionally, when the second uplink control information includes at least one of the hybrid automatic repeat request information or the scheduling request information, and the channel state information, that the third uplink control information includes some of the second uplink control information means that the third uplink control information includes another part other than the channel state information in the second uplink control information.

Optionally, when the second uplink control information includes at least one of the hybrid automatic repeat request information or the scheduling request information and the first uplink control information includes the channel state information and does not include the hybrid automatic repeat request information and the scheduling request information, the third uplink control information includes some or all of the second uplink control information.

The situation 2 is also specifically described below by using FIG. 7 as an example. As shown in FIG. 7, it is assumed that a length of the time domain resource corresponding to the first uplink control information is two symbols specifically corresponding to a symbol 0 and a symbol 1 that are used to transmit the first uplink control information; and a length of the time domain resource corresponding to the second uplink control information is four symbols specifically corresponding to symbols 0, 1, 2, and 3 that are used to transmit the second uplink control information. The time domain resource corresponding to the first uplink control information overlaps with the time domain resource corresponding to the second uplink control information on the symbol 0 and the symbol 1. The symbol 0 and the symbol 1 on the uplink carrier are indicated by using 7209, and the symbol 2 and the symbol 3 on the uplink carrier are indicated by using 7210. In the example shown in FIG. 7, the resource corresponding to the first uplink control information does not overlap with the resource corresponding to the second uplink control information in frequency domain.

The user equipment should originally transmit the first uplink control information on the resource corresponding to the first uplink control information, and transmit the second uplink control information on the resource corresponding to the second uplink control information. When the time domain resource corresponding to the first uplink control information overlaps with the time domain resource corresponding to the second uplink control information, because uplink sending of the user equipment has a single carrier characteristic, the user equipment may transmit some or all of the second uplink control information on the overlapping time domain resource such as the symbols indicated by 7209 in FIG. 7. Correspondingly, the user equipment does not transmit the first uplink control information on the overlapping time domain resource such as the symbols indicated by 7209 in FIG. 7. If all of the time domain resource corresponding to the first uplink control information overlaps with some of the time domain resource corresponding to the second uplink control information, the user equipment may discard transmission of the first uplink control information. If some of the time domain resource corresponding to the first uplink control information overlaps with some of the time domain resource corresponding to the second uplink control information, the user equipment transmits some or all of the first uplink control information on a time domain resource that does not include the overlapping time domain resource and that is in the time domain resource corresponding to the first uplink control information.

Optionally, that the user equipment transmits some or all of the second uplink control information on the overlapping time domain resource may be that the user equipment transmits some or all of the second uplink control information on a resource that corresponds to the first uplink control information and that is in the overlapping time domain resource. For example, the user equipment transmits some or all of the second uplink control information on a resource indicated by 72091 in FIG. 7.

Optionally, that the user equipment transmits some or all of the second uplink control information on the overlapping time domain resource may be that the user equipment transmits some or all of the second uplink control information on a resource that corresponds to the second uplink control information and that is in the overlapping time domain resource. For example, the user equipment transmits some or all of the second uplink control information on a resource indicated by 72092 in FIG. 7.

Situation 3: The third uplink control information includes the fourth uplink control information and the fifth uplink control information. That is, the third uplink control information includes some or all of the first uplink control information, and some or all of the second uplink control information.

That is, the user equipment transmits some or all of the first uplink control information and some or all of the second uplink control information on the overlapping time domain resource of the time domain resource corresponding to the first uplink control information and the time domain resource corresponding to the second uplink control information.

As described in the situation 1, usually, when the uplink control information includes at least two of three pieces of information: hybrid automatic repeat request information, scheduling request information, and channel state information, it may be considered that a priority of the hybrid automatic repeat request information and/or the scheduling request information is higher than that of the channel state information.

Optionally, when the first uplink control information includes at least one of the hybrid automatic repeat request information or the scheduling request information, and the channel state information, that the third uplink control information includes some of the first uplink control information means that the third uplink control information includes another part other than the channel state information in the first uplink control information. Optionally, when the second uplink control information includes at least one of the hybrid automatic repeat request information or the scheduling request information, and the channel state information, that the third uplink control information includes some of the second uplink control information means that the third uplink control information includes another part other than the channel state information in the second uplink control information.

The situation 3 is also specifically described below by using FIG. 7 as an example. As shown in FIG. 7, it is assumed that a length of the time domain resource corresponding to the first uplink control information is two symbols specifically corresponding to a symbol 0 and a symbol 1 that are used to transmit the first uplink control information; and a length of the time domain resource corresponding to the second uplink control information is four symbols specifically corresponding to symbols 0, 1, 2, and 3 that are used to transmit the second uplink control information. The time domain resource corresponding to the first uplink control information overlaps with the time domain resource corresponding to the second uplink control information on the symbol 0 and the symbol 1. The symbol 0 and the symbol 1 on the uplink carrier are indicated by using 7209, and the symbol 2 and the symbol 3 on the uplink carrier are indicated by using 7210. In the example shown in FIG. 7, the resource corresponding to the first uplink control information does not overlap with the resource corresponding to the second uplink control information in frequency domain.

The user equipment should originally transmit the first uplink control information on the resource corresponding to the first uplink control information, and transmit the second uplink control information on the resource corresponding to the second uplink control information. When the time domain resource corresponding to the first uplink control information overlaps with the time domain resource corresponding to the second uplink control information, the user equipment may transmit some or all of the first uplink control information and some or all of the second uplink control information on the overlapping time domain resource such as the symbols indicated by 7209 in FIG. 7.

Optionally, the user equipment transmits some or all of the first uplink control information and some or all of the second uplink control information on a resource that corresponds to the first uplink control information and that is in the overlapping time domain resource. For example, the user equipment transmits some or all of the first uplink control information and some or all of the second uplink control information on a resource indicated by 72091 in FIG. 7.

Optionally, the user equipment transmits some or all of the first uplink control information and some or all of the second uplink control information on a resource that corresponds to the second uplink control information and that is in the overlapping time domain resource. For example, the user equipment transmits some or all of the first uplink control information and some or all of the second uplink control information on a resource indicated by 72092 in FIG. 7.

Optionally, the user equipment transmits some or all of the first uplink control information on a resource that corresponds to the first uplink control information and that is in the overlapping time domain resource, and transmits some or all of the second uplink control information on a resource that corresponds to the second uplink control information and that is in the overlapping time domain resource. For example, the user equipment transmits some or all of the first uplink control information on a resource indicated by 72091 in FIG. 7, and transmits some or all of the second uplink control information on a resource indicated by 72092 in FIG. 7.

Optionally, the user equipment may transmit some or all of the first uplink control information and some or all of the second uplink control information on the overlapping time domain resource in a frequency division multiplexing or code division multiplexing manner. Optionally, the user equipment may transmit some or all of the first uplink control information and some or all of the second uplink control information on the overlapping time domain resource in a joint coding manner or a manner of separately encoding the first uplink control information and the second uplink control information. Optionally, the user equipment may further transmit some or all of the first uplink control information and some or all of the second uplink control information on the overlapping time domain resource in a time division multiplexing manner. For example, in the embodiment shown in FIG. 7, the user equipment transmits some or all of the first uplink control information on the symbol 0, and transmits some or all of the second uplink control information on the symbol 1.

Because the user equipment may multiplex some or all of the first uplink control information and some or all of the second uplink control information in the joint coding or code division manner, further optionally, the user equipment may transmit some or all of the first uplink control information and some or all of the second uplink control information on the resource corresponding to the first uplink control information and/or the resource corresponding to the second uplink control information.

It should be noted that, in a specific embodiment, one or more of solutions described in the foregoing three situations may be used to resolve the technical problem of the foregoing provided conflict 1) or conflict 2).

In this embodiment of the present application, in the situation 1, the user equipment transmits some or all of only the first uplink control information on the overlapping time domain resource. Because the length of the time domain resource corresponding to the second uplink control information is greater than the length of the time domain resource corresponding to the first uplink control information, the user equipment may send some or all of the second uplink control information on a time domain resource that does not include the overlapping time domain resource and that is in the time domain resource corresponding to the second uplink control information, thereby ensuring that all uplink control information of a higher priority in the first uplink control information and the second uplink control information can be transmitted. In the situation 2, the user equipment transmits some or all of only the second uplink control information on the overlapping time domain resource, so as to ensure that uplink control information of a higher priority in the second uplink control information may obtain more transmission resources, thereby ensuring demodulation performance of the uplink control information. In the situation 3, some or all of the first uplink control information and some or all of the second uplink control information are transmitted on the overlapping time domain resource in the multiplexing manner, so as to ensure that all uplink control information of a higher priority in the first uplink control information and the second uplink control information can be transmitted.

For a case in which one situation is used to resolve the problem, refer to the foregoing description. Details are not described herein again. A case in which two situations are used to resolve the problem is described below by providing an embodiment, and the embodiment may specifically correspond to the technical problem of the conflict 2).

Figure 8:
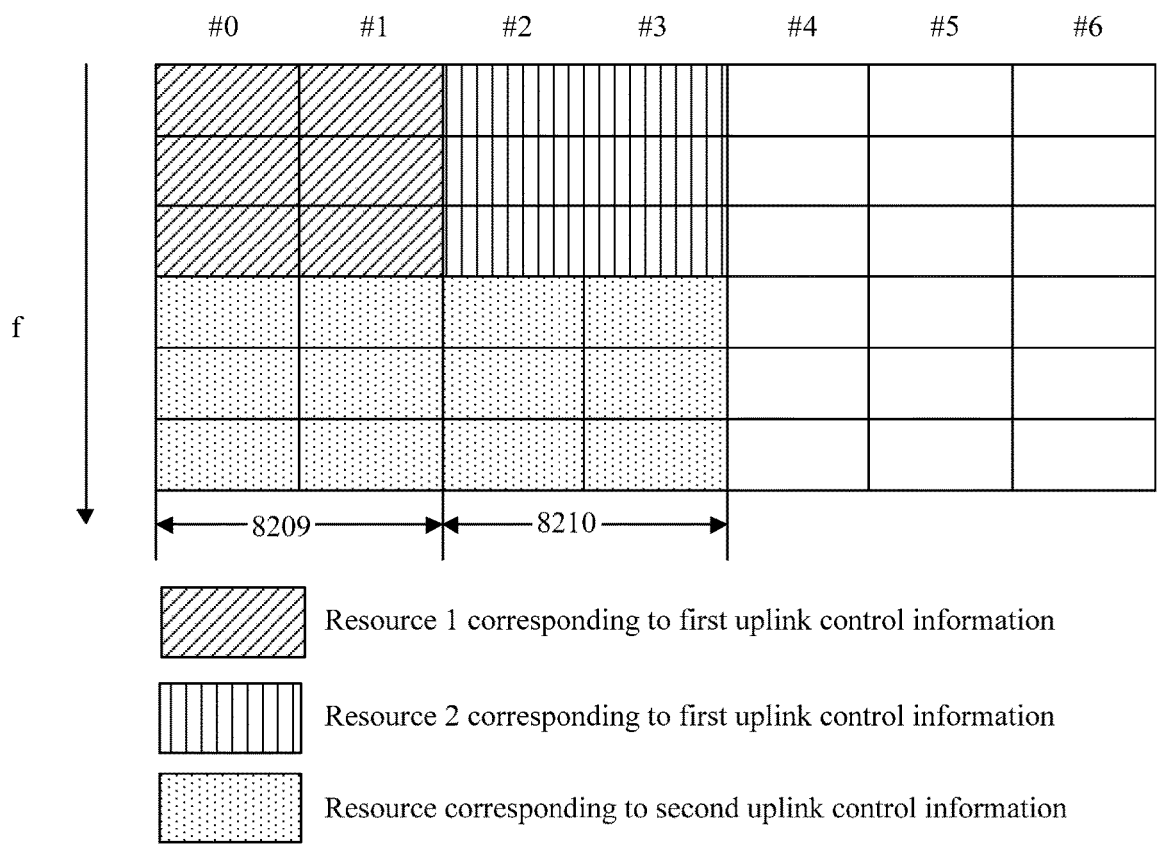
FIG. 8 is a schematic diagram showing that a time domain resource corresponding to first uplink control information overlaps with a time domain resource corresponding to second uplink control information on a same uplink carrier according to an embodiment of the present invention.

Specifically, FIG. 8 is used as an example for description. FIG. 8 is a schematic diagram showing that a time domain resource corresponding to first uplink control information overlaps with a time domain resource corresponding to second uplink control information on a same uplink carrier according to an embodiment of the present application. As shown in FIG. 8, it is assumed that a length of the time domain resource corresponding to the first uplink control information is two symbols, and two resources that are used to transmit the first uplink control information and that are continuous in time domain are configured for the UE, where a resource 1 corresponding to the first uplink control information specifically corresponds to a symbol 0 and a symbol 1 that are used to transmit first uplink control information 1, and a resource 2 corresponding to the first uplink control information specifically corresponds to a symbol 2 and a symbol 3 that are used to transmit first uplink control information 2. A length of the time domain resource corresponding to the second uplink control information is four symbols specifically corresponding to symbols 0, 1, 2, and 3 that are used to transmit the second uplink control information. The time domain resource corresponding to the first uplink control information overlaps with the time domain resource corresponding to the second uplink control information on all of the symbols 0, 1, 2, and 3. The symbol 0 and the symbol 1 on the uplink carrier are indicated by using 8209, and the symbol 2 and the symbol 3 on the uplink carrier are indicated by using 8210. In the example shown in FIG. 8, the resource corresponding to the first uplink control information does not overlap with the resource corresponding to the second uplink control information in frequency domain.

Optionally, when preparing content needing to be transmitted on 8209, the user equipment finds that the first uplink control information 1 conflicts with the second uplink control information, the first uplink control information 1 can be transmitted on only 8209, and the second uplink control information can be transmitted on 8209 and 8210. Therefore, on the overlapping time domain resource 8209, the user equipment may use the situation 1, that is, transmit the first uplink control information 1 on 8209 and discard transmission of the second uplink control information. When preparing content needing to be transmitted on 8210, the user equipment finds that the first uplink control information 2 conflicts with the second uplink control information. In this case, both the first uplink control information 2 and the second uplink control information can be transmitted on only 8210. Therefore, on the overlapping time domain resource 8210, the user equipment may use the situation 3, that is, transmit the first uplink control information 2 and the second uplink control information in the multiplexing manner.

Optionally, the user equipment determines that priorities of the first uplink control information 2 and the second uplink control information are higher than that of the first uplink control information 1. Therefore, on the overlapping time domain resource 8209, the user equipment may use the situation 2, that is, transmit the second uplink control information on 8209 and discard transmission of the first uplink control information 1. Because the second uplink control information is transmitted on 8209, the user equipment may use the situation 1 on the overlapping time domain resource 8210, that is, transmit the first uplink control information 2 on 8210 and discard transmission of the second uplink control information, or the user equipment uses the situation 3 on 8210, that is, transmit the first uplink control information 2 and the second uplink control information in the multiplexing manner.

Optionally, the user equipment determines that priorities of the first uplink control information 1 and the second uplink control information are higher than that of the first uplink control information 2. Similarly, the user equipment may use the situation 1 or the situation 3 on the overlapping time domain resource 8209, and the user equipment may use the situation two on the overlapping time domain resource 8210.

In this embodiment of the present application, at least two of the solutions described in the foregoing three situations are used to resolve the technical problem of the foregoing provided conflict 1) or conflict 2), so as to ensure that in uplink control information in which a conflict occurs, uplink control information of a higher priority may be transmitted in a case of being subject to relatively small interference, thereby ensuring demodulation performance of the uplink control information of the higher priority.

This embodiment of the present application provides an uplink control information transmission method. When there are at least two pieces of uplink control information corresponding to time domain resources of different lengths and the time domain resources corresponding to the at least two pieces of uplink control information overlap, some or all of only one of the at least two pieces of uplink control information is transmitted, or some or all of each of two pieces of uplink control information is transmitted by using a multiplexing method, so as to ensure that uplink control information of a higher priority is transmitted, or ensure demodulation performance of uplink control information of a higher priority.

It should be noted that, each conventional PUCCH format is based on a 1-ms TTI. If short TTI transmission is introduced in uplink, a new uplink control channel supporting the short TTI transmission is needed correspondingly, for example, a channel structure supporting a PUCCH whose TTI length is less than 1 ms or a new PUCCH format. This embodiment of the present application provides a new PUCCH channel structure or a new PUCCH format, so that a PUCCH can be used for transmission in an uplink short TTI. For convenience of distinguishing the new PUCCH format from the PUCCH format in the prior art, in this embodiment of the present application, a time domain resource corresponding to the new PUCCH format is referred to as a preset resource.

Embodiment 2

Figure 9:
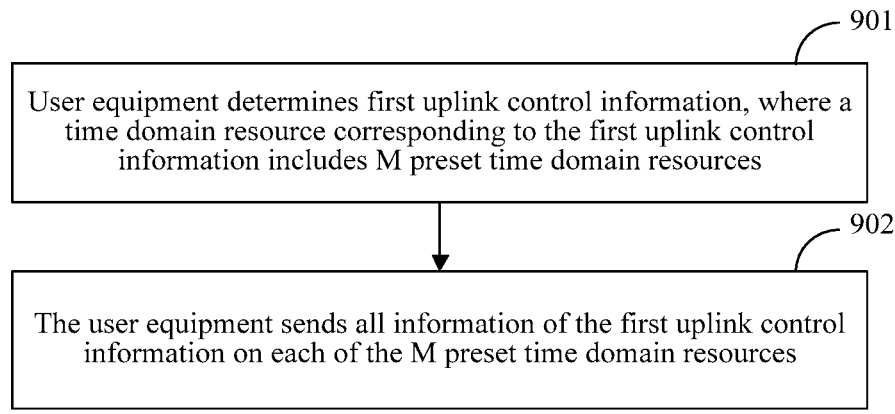
FIG. 9 is a flowchart of an uplink control information transmission method according to an embodiment of the present invention.

FIG. 9 shows an uplink control information transmission method according to an embodiment of the present application. As shown in FIG. 9, the method includes the following steps.

Step 901. User equipment determines first uplink control information.

A length of a time domain resource corresponding to the first uplink control information is less than one millisecond, the time domain resource corresponding to the first uplink control information includes M preset time domain resources, and M is an integer greater than or equal to one.

A length corresponding to each of the M preset time domain resources is less than six symbols.

The first uplink control information includes at least one of hybrid automatic repeat request information, channel state information, and scheduling request information.

It should be noted that, the channel state information includes at least one of CQI information, PMI information, and RI information.

In the process of specifically implementing step 901, optionally, the length of the time domain resource corresponding to the first uplink control information is a length of a PUCCH corresponding to the first uplink control information. Optionally, the length of the time domain resource corresponding to the first uplink control information is 0.5 ms, 0.25 ms, four symbols, three symbols, two symbols, or one symbol. Optionally, the length of the time domain resource corresponding to the first uplink control information is a first transmission time interval TTI time length. Further, optionally, the first TTI time length is less than 1 ms. For example, the first TTI time length is 0.5 ms, 0.25 ms, four symbols, three symbols, two symbols, or one symbol.

In the process of specifically implementing step 901, optionally, a resource corresponding to the first uplink control information is a PUCCH channel resource corresponding to the first uplink control information.

In the process of specifically implementing step 901, optionally, a base station allocates the time domain resource corresponding to the first uplink control information to the user equipment. Further, optionally, the base station notifies the user equipment of resource allocation information of the time domain resource corresponding to the first uplink control information in a manner such as by using RRC signaling, MAC signaling, or physical layer signaling. Further, optionally, the RRC signaling, MAC signaling, or physical layer signaling may be borne on a current carrier, or may be borne on a non-current carrier. Optionally, the user equipment may further determine the time domain resource corresponding to the first uplink control information in a predefined manner.

In the process of specifically implementing step 901, optionally, the user equipment receives indication information sent by the base station, and the indication information includes the resource allocation information of the time domain resource corresponding to the first uplink control information. It should be noted that, resource allocation information of a time domain resource corresponding to uplink control information may be indication information of a length of the time domain resource corresponding to the uplink control information, may be indication information of a TTI length of a PUCCH corresponding to the uplink control information, may be indication information of a PUCCH channel resource corresponding to the uplink control information, or may be resource allocation information that corresponds to the uplink control information and that includes a time domain resource indicator, and/or a frequency domain resource indicator, and/or a space domain resource indicator, and/or a code resource indicator.

It should be noted that, in step 901, the time domain resource corresponding to the first uplink control information is a time domain resource that is used to transmit the first uplink control information and that is pre-allocated to the user equipment, and a time domain resource used during actual transmission of the first uplink control information is unnecessarily all of the pre-allocated time domain resource corresponding to the first uplink control information.

In the process of specifically implementing step 901, optionally, the M preset time domain resources are continuous in time domain. Optionally, the M preset time domain resources are discontinuous in time domain.

Figure 10:
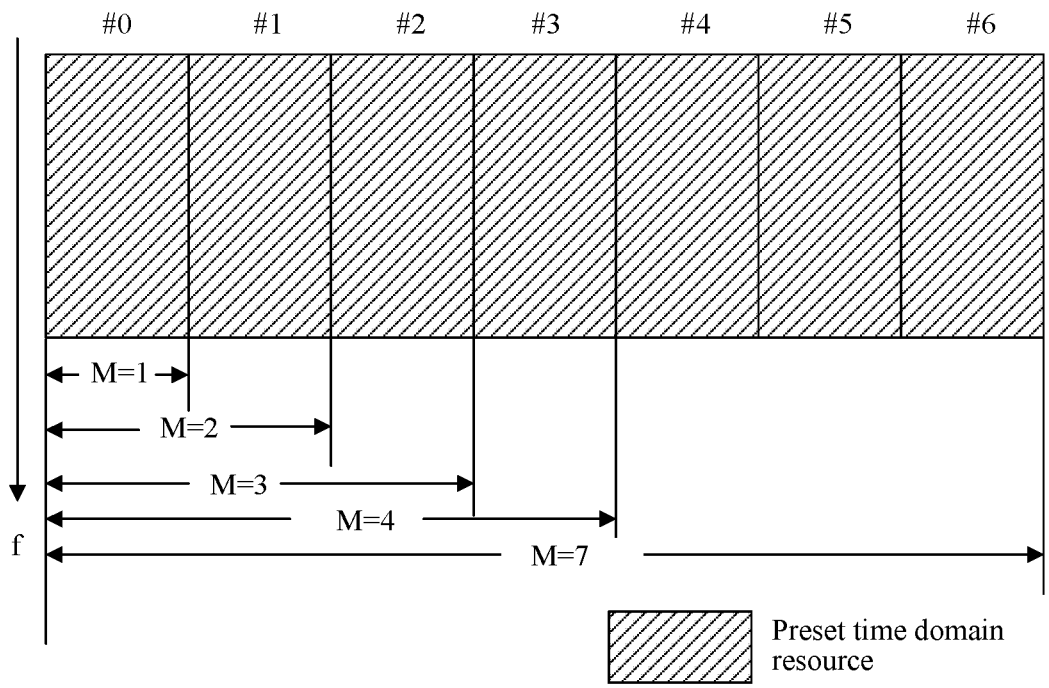
FIG. 10 is a schematic diagram showing that a length corresponding to each of M preset time domain resources is one symbol according to an embodiment of the present invention.

In the process of specifically implementing step 901, optionally, the length corresponding to each of the M preset time domain resources is one symbol. FIG. 10 is used as an example for specific description. As shown in FIG. 10, when a length of each preset time domain resource is one symbol, and a length of a time domain resource corresponding to first uplink control information is 0.5 ms, the time domain resource corresponding to the first uplink control information includes seven preset time domain resources; and when lengths of time domain resources corresponding to the first uplink control information are respectively four symbols, three symbols, two symbols, and one symbol, the time domain resources corresponding to the first uplink control information respectively include four preset time domain resources, three preset time domain resources, two preset time domain resources, and one preset time domain resource.

Figure 11:
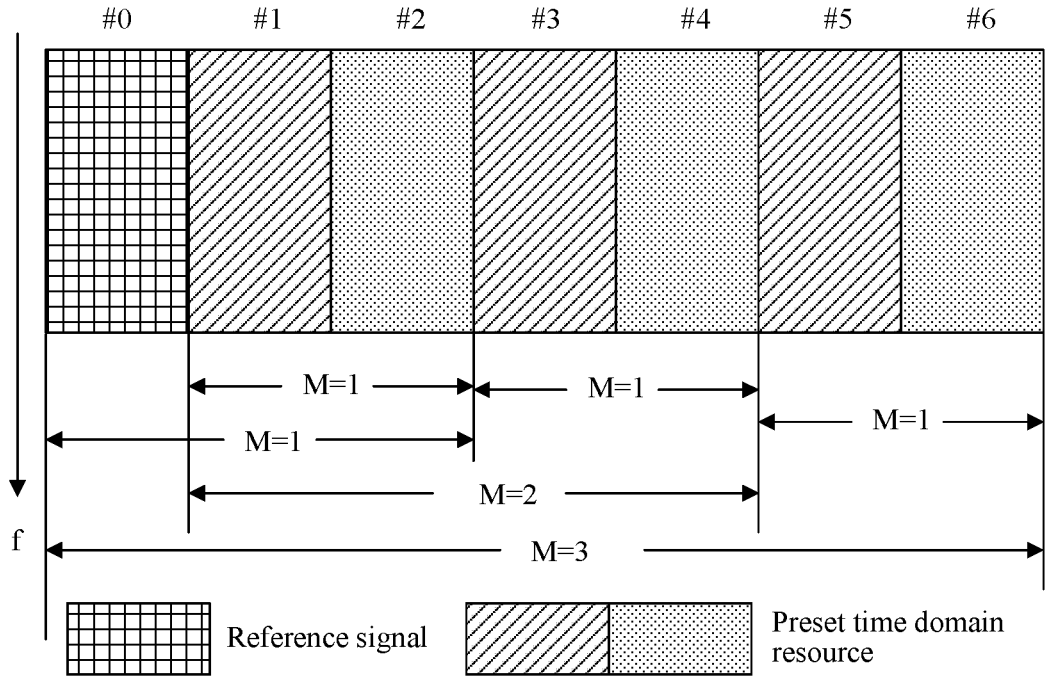
FIG. 11 is a schematic diagram showing that a length corresponding to each of M preset time domain resources is two symbols according to an embodiment of the present invention.

In the process of specifically implementing step 901, optionally, the length corresponding to each of the M preset time domain resources is two symbols. FIG. 11 is used as an example for specific description. As shown in FIG. 11, when a length of each preset time domain resource is two symbols, and a length of a time domain resource corresponding to first uplink control information is 0.5 ms, the time domain resource corresponding to the first uplink control information includes three preset time domain resources; and when lengths of time domain resources corresponding to the first uplink control information are respectively four symbols, three symbols, and two symbols, the time domain resources corresponding to the first uplink control information respectively include two preset time domain resources, one preset time domain resource, and one preset time domain resource.

Figure 12:
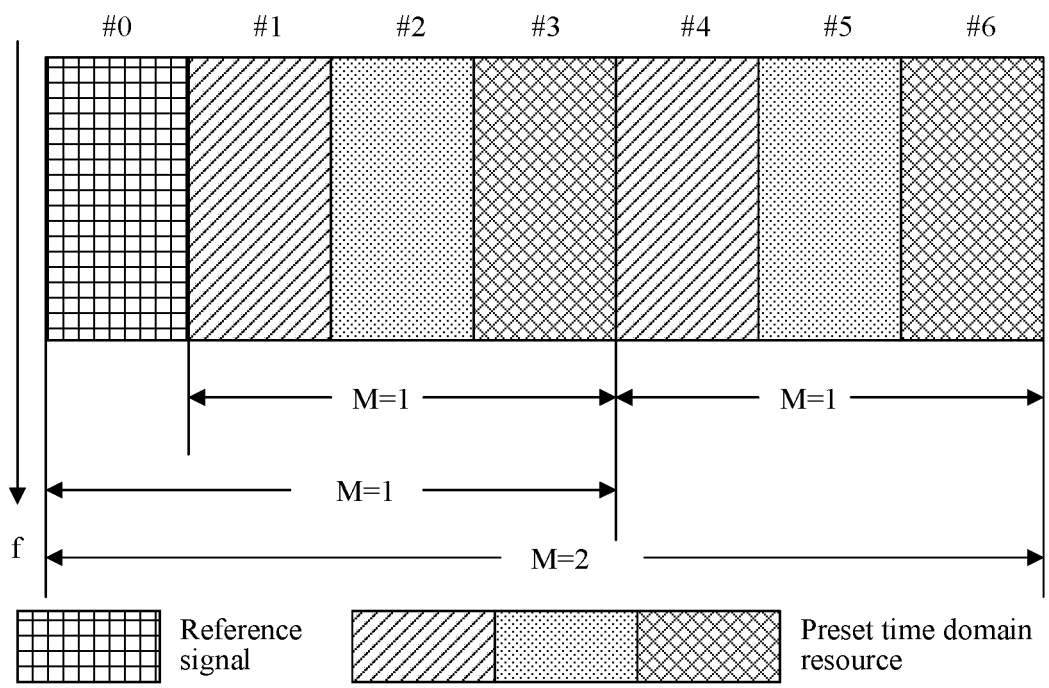
FIG. 12 is a schematic diagram showing that a length corresponding to each of M preset time domain resources is three symbols according to an embodiment of the present invention.

In the process of specifically implementing step 901, optionally, the length corresponding to each of the M preset time domain resources is three symbols. FIG. 12 is used as an example for specific description. As shown in FIG. 12, when a length of each preset time domain resource is three symbols, and a length of a time domain resource corresponding to first uplink control information is 0.5 ms, the time domain resource corresponding to the first uplink control information includes two preset time domain resources; and when lengths of time domain resources corresponding to the first uplink control information are respectively four symbols and three symbols, each of the time domain resources corresponding to the first uplink control information includes one preset time domain resource.

It should be noted that, in addition to an integer quantity of preset time domain resources, time domain resources corresponding to the first uplink control information may further include a time domain resource whose length is less than that of a preset time domain resource. For example, in a situation shown in FIG. 11, when a length of a preset time domain resource is two symbols, and a length of a time domain resource corresponding to first uplink control information is three symbols, in addition to one preset time domain resource, the time domain resource corresponding to the first uplink control information further includes a time domain resource of one symbol. For another example, in a situation shown in FIG. 12, when a length of a preset time domain resource is three symbols, and a length of a time domain resource corresponding to first uplink control information is four symbols, in addition to one preset time domain resource, the time domain resource corresponding to the first uplink control information further includes a time domain resource of one symbol. Optionally, the time domain resource whose length is less than that of the preset time domain resource may be used to repetitively transmit some or all content of the preset time domain resource. Optionally, the time domain resource whose length is less than that of the preset time domain resource may be used to transmit a reference signal. Placing a reference signal in front may make a receiving side perform channel estimation as soon as possible, thereby reducing a processing delay of a receive end. Therefore, further optionally, the reference signal is sent before a preset time domain resource is sent. As shown in FIG. 11 or FIG. 12, the time domain resource whose length is less than that of the preset time domain resource is used to transmit a reference signal, and the reference signal is placed on a first symbol in a timeslot.

Step 902. The user equipment sends all information of the first uplink control information on each of the M preset time domain resources.

It should be noted that, a time domain resource corresponding to the first uplink control information may be a time domain resource corresponding to a PUCCH. The data transmission method of this embodiment may be considered as a PUCCH channel structure solution, where a PUCCH format corresponding to the PUCCH channel resource is sent on each of the M preset time domain resources.

It should be noted that, each of the M preset time domain resources carries all information of the first uplink control information. The preset time domain resources may transmit the first uplink control information in a same form. For example, the M preset time domain resources repetitively send the first uplink control information. Alternatively, the preset time domain resources may transmit the first uplink control information in different forms. For example, different preset time domain resources of the M preset time domain resources use different scrambling codes. Optionally, frequency domain resources corresponding to all of the M preset time domain resources may be the same or different. For example, a frequency domain resource corresponding to each of the M preset time domain resources may perform frequency hopping transmission based on a predefined frequency hopping pattern or a frequency hopping pattern notified by the base station. Optionally, code resources corresponding to all of the M preset time domain resources may be the same or different. For example, a code resource corresponding to each of the M preset time domain resources may perform frequency hopping transmission based on a predefined code resource or a code resource notified by the base station.

It should be noted that, because all of the M preset time domain resources carry the same uplink control information content, to enable the receive end to independently demodulate each preset time domain resource, a reference signal needs to be sent. The reference signal may be borne on each of the M preset time domain resources, or may be borne on a time domain resource other than the M preset time domain resources.

In the process of specifically implementing step 902, optionally, at least a reference signal is sent on each of the M preset time domain resources. In consideration of a single carrier characteristic of uplink transmission of the user equipment, optionally, at least a reference signal of one symbol is sent on each of the M preset time domain resources. To reduce a demodulation delay of the receive end, optionally, at least a first symbol on each of the M preset time domain resources is used to send a reference signal. Optionally, if a length of a preset time domain resource is one symbol, the symbol is used to send a reference signal, and content of uplink control information may be carried in the reference signal. For example, different code resources are used to distinguish content of sent uplink control information.

Because a TTI is shortened, the single carrier characteristic may be damaged in the uplink transmission of the user equipment. In the process of specifically implementing step 902, optionally, frequency division multiplexing is performed on a reference signal and content of uplink control information. For example, if a length of a preset time domain resource is one symbol, both a reference signal and content of uplink control information are sent on the symbol. The reference signal and the content of the uplink control information occupy different frequency resources.

This embodiment of the present application may be further applied to a scenario in which a TTI length of downlink transmission is not equal to that of uplink transmission corresponding to the downlink transmission. The uplink carrier and the downlink carrier 2 in FIG. 4 are used as an example below for specific description. It is assumed that a time length of a TTI of the uplink carrier is equal to a time length of N TTIs of the downlink carrier 2, and a length of a preset time domain resource is equal to a length of a TTI of the downlink carrier 2. That is, assuming that the time length of the TTI of the downlink carrier 2 is L2, the time length of the TTI of the uplink carrier is L1=N*L2, and a time domain resource corresponding to one piece of uplink control information includes N preset time domain resources. In the embodiment shown in FIG. 4, N=2. As shown in FIG. 4, in a HARQ time sequence, HARQ-ACK information corresponding to data in a $k^{th}$ TTI of the downlink carrier 2 is fed back in the TTI of the uplink carrier corresponding to a $(k+4)^{th}$ TTI of the downlink carrier 2. That is, HARQ-ACK information in 4301 is fed back in 4203, HARQ-ACK information in 4305 is fed back on a former half part of 4205, and HARQ-ACK information in 4306 is fed back on a latter half part of 4205. If the user equipment has not been continuously scheduled in a plurality of downlink TTIs, that is, if the user equipment is scheduled in 4301, the user equipment may transmit uplink control information corresponding to 4301 in a TTI that includes two preset time domain resources and that is indicated by 4203. To reduce a delay, the base station may demodulate only a first preset time domain resource to determine uplink control information. To improve demodulation performance, the base station may also demodulate two preset time domain resources jointly to determine uplink control information. If the user equipment is continuously scheduled in a plurality of downlink TTIs, as shown in the figure, assuming that the user equipment is scheduled in 4305 and 4306, the user equipment may transmit uplink control information corresponding to 4305 on the first preset time domain resource in a TTI that includes two preset time domain resources and that is indicated by 4205, and transmit uplink control information corresponding to 4306 on a second preset time domain resource in a TTI that includes two preset time domain resources and that is indicated by 4205. Correspondingly, the base station demodulates the uplink control information corresponding to 4305 on the first preset time domain resource in the TTI that includes two preset time domain resources and that is indicated by 4205, and demodulates the uplink control information corresponding to 4306 on the second preset time domain resource in the TTI that includes two preset time domain resources and that is indicated by 4205.

In this embodiment of the present application, the method may further include:

determining, by the user equipment, second uplink control information, where the second uplink control information includes at least one of hybrid automatic repeat request information, channel state information, and scheduling request information; and sending, by the user equipment, the second uplink control information on a time domain resource corresponding to the second uplink control information, where the length of the time domain resource corresponding to the first uplink control information is less than a length of the time domain resource corresponding to the second uplink control information.

It should be noted that, a sequence in which the user equipment determines the first uplink control information and the second uplink control information is not limited herein.

Optionally, the length of the time domain resource corresponding to the second uplink control information is a length of a PUCCH corresponding to the second uplink control information. Optionally, the length of the time domain resource corresponding to the second uplink control information is 1 ms, 0.5 ms, 0.25 ms, four symbols, three symbols, or two symbols.

Optionally, when the length of the time domain resource corresponding to the second uplink control information is 1 ms, the second uplink control information is transmitted by selecting at least one of PUCCH formats in which lengths are 1 ms.

Optionally, when the length of the time domain resource corresponding to the second uplink control information is less than or equal to 1 ms, the time domain resource corresponding to the second uplink control information includes N preset time domain resources, where N is an integer greater than 1. It should be noted that, a method for determining, by the user equipment, the second uplink control information and sending the second uplink control information on the time domain resource corresponding to the second uplink control information is the same as a method, described in steps 901 and 902, for determining, by the user equipment, the first uplink control information and sending the first uplink control information on the time domain resource corresponding to the first uplink control information. Details are not described herein again.

In this embodiment of the present application, all of the M preset time domain resources carry the same uplink control information content, and the receive end may demodulate the M preset time domain resources jointly to improve demodulation performance, or may independently demodulate each preset time domain resource. Therefore, with reference to the PUCCH channel structure in this embodiment of the present application, when there are two pieces of uplink control information corresponding to time domain resources of different lengths and the time domain resources corresponding to the two pieces of uplink control information overlap, uplink control information can still be correctly demodulated when the uplink control information is transmitted on some of a time domain resource that corresponds to the uplink control information and that is pre-allocated for the uplink control information. Therefore, in this embodiment of the present application, the method may further include:

when the time domain resource corresponding to the first uplink control information overlaps with the time domain resource corresponding to the second uplink control information, transmitting, by the user equipment, third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Specifically, the third uplink control information may include the following eight situations:

some information of the first uplink control information;
some information of the second uplink control information;
all information of the first uplink control information;
all information of the second uplink control information;
some information of the first uplink control information and some information of the second uplink control information;
some information of the first uplink control information and all information of the second uplink control information;
all information of the first uplink control information and some information of the second uplink control information; and
all information of the first uplink control information and all information of the second uplink control information.

The uplink control information transmission channel structure or method that is provided in this embodiment of the present application may be further used with reference to the uplink control information transmission method in Embodiment 1 of the present application. For a specific implementation method, refer to the implementation method of Embodiment 1 of the present application. Repetitive details are not described herein again.

Based on the uplink control information transmission channel structure or method that is provided in this embodiment of the present application, uplink control information can still be correctly demodulated when the uplink control information is transmitted on some of a time domain resource that corresponds to the uplink control information and that is pre-allocated for the uplink control information. Further, when there are a plurality of pieces of uplink control information corresponding to time domain resources of different lengths and the time domain resources corresponding to the plurality of pieces of uplink control information overlap, the plurality of pieces of uplink control information may be transmitted and correctly demodulated based on the method provided in this embodiment of the present application.

The uplink control information transmission method of Embodiment 1 of the present application is applied to the user equipment, and the user equipment determines the first uplink control information and the second uplink control information. When the time domain resource corresponding to the first uplink control information overlaps with the time domain resource corresponding to the second uplink control information, the user equipment transmits the third uplink control information on the overlapping time domain resource. In the foregoing embodiment of the present application, a plurality of application examples of the third uplink control information are specifically described. The user equipment sends the third uplink control information to the base station, and the base station receives the third uplink control information.

Embodiment 3

Figure 13:
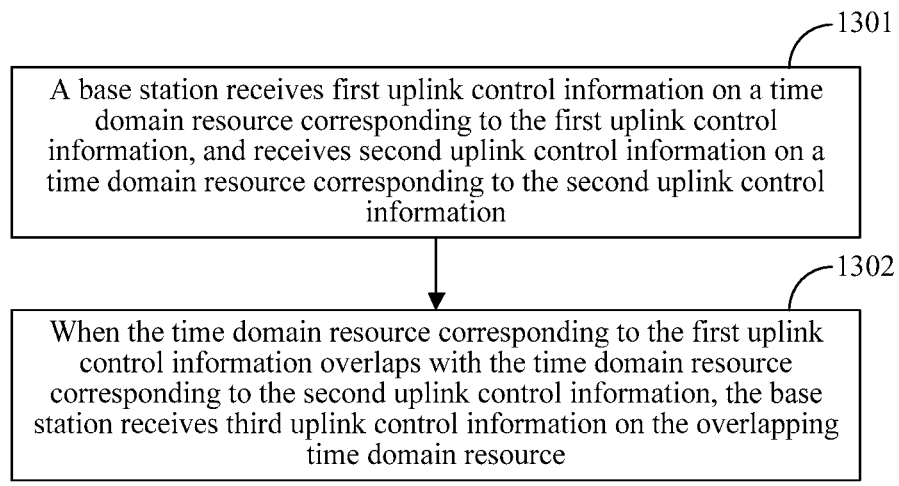
FIG. 13 is a flowchart of an uplink control information transmission method according to an embodiment of the present invention.

This embodiment of the present application further discloses an uplink control information transmission method, applied to a base station. FIG. 13 is a flowchart of the uplink control information transmission method according to this embodiment of the present application. As shown in FIG. 13, the method includes the following steps.

Step 1301. The base station receives first uplink control information on a time domain resource corresponding to the first uplink control information, and receives second uplink control information on a time domain resource corresponding to the second uplink control information.

A length of the time domain resource corresponding to the first uplink control information is less than a length of the time domain resource corresponding to the second uplink control information, and the first uplink control information or the second uplink control information includes at least one of hybrid automatic repeat request information, channel state information, and scheduling request information.

Step 1302. When the time domain resource corresponding to the first uplink control information overlaps with the time domain resource corresponding to the second uplink control information, the base station receives third uplink control information on the overlapping time domain resource.

The third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

It should be noted that, the base station receives the first uplink control information and the second uplink control information in an indefinite sequence.

It should be noted that, in the method provided in this embodiment of the present application, content included in the first uplink control information, the length of the time domain resource corresponding to the first uplink control information, a method for determining the length of the time domain resource corresponding to the first uplink control information, and the like are the same as content included in the first uplink control information, the length of the time domain resource corresponding to the first uplink control information, a method for determining the length of the time domain resource corresponding to the first uplink control information, and the like that are described in Embodiment 1 of the present application. Details are not described herein again.

It should be noted that, in the method provided in this embodiment of the present application, content included in the second uplink control information, the length of the time domain resource corresponding to the second uplink control information, a method for determining the length of the time domain resource corresponding to the second uplink control information, and the like are the same as content included in the second uplink control information, the length of the time domain resource corresponding to the second uplink control information, a method for determining the length of the time domain resource corresponding to the second uplink control information, and the like that are described in Embodiment 1 of the present application. Details are not described herein again.

It should be noted that, in the method provided in this embodiment of the present application, a method for included content, an indication form, a bearer resource, a sending manner, and the like of the third uplink control information is the same as a method for included content, an indication form, a bearer resource, a sending manner, and the like of the third uplink control information that is described in Embodiment 1 of the present application. Details are not described herein again.

As shown in Embodiment 1, this embodiment is also divided into three situations based on different content of the third uplink control information.

Situation 1: The third uplink control information includes the fourth uplink control information, that is, the third uplink control information includes some or all of the first uplink control information.

That is, the base station receives some or all of only the first uplink control information on the overlapping time domain resource of the time domain resource corresponding to the first uplink control information and the time domain resource corresponding to the second uplink control information.

The situation 1 is specifically described by using FIG. 7 as an example. As shown in FIG. 7, it is assumed that a length of the time domain resource corresponding to the first uplink control information is two symbols specifically corresponding to a symbol 0 and a symbol 1 that are used to transmit the first uplink control information; and A length of the time domain resource corresponding to the second uplink control information is four symbols specifically corresponding to symbols 0, 1, 2, and 3 that are used to transmit the second uplink control information. The time domain resource corresponding to the first uplink control information overlaps with the time domain resource corresponding to the second uplink control information on the symbol 0 and the symbol 1. The symbol 0 and the symbol 1 are indicated by using 7209, and the symbol 2 and the symbol 3 are indicated by using 7210. In the example shown in FIG. 7, the resource corresponding to the first uplink control information does not overlap with the resource corresponding to the second uplink control information in frequency domain. The user equipment sends some or all of the first uplink control information on the overlapping time domain resource of the time domain resource corresponding to the first uplink control information and the time domain resource corresponding to the second uplink control information, for example, on the symbols indicated by 7209 in FIG. 7.

Correspondingly, the base station receives some or all of the first uplink control information on the overlapping time domain resource such as the symbols indicated by 7209 in FIG. 7. The base station receives some or all of the second uplink control information on a time domain resource that does not include the overlapping time domain resource and that is in the time domain resource corresponding to the second uplink control information, for example, on the symbols indicated by 7210 in FIG. 7. The base station does not receive the second uplink control information on the overlapping time domain resource such as the symbols indicated by 7209 in FIG. 7.

Optionally, that the base station receives some or all of the first uplink control information on the overlapping time domain resource may be that the base station receives some or all of the first uplink control information on a resource that corresponds to the first uplink control information and that is in the overlapping time domain resource. For example, the base station receives some or all of the first uplink control information on a resource indicated by 72091 in FIG. 7.

Optionally, that the base station receives some or all of the first uplink control information on the overlapping time domain resource may be that the base station receives some or all of the first uplink control information on a resource that corresponds to the second uplink control information and that is in the overlapping time domain resource. For example, the base station receives some or all of the first uplink control information on a resource indicated by 72092 in FIG. 7.

In FIG. 7, four rectangular frames at an upper left corner are 72091, and four rectangular frames at a lower left corner are 72092.

Situation 2: The third uplink control information includes the fifth uplink control information, that is, the third uplink control information includes some or all of the second uplink control information.

That is, the base station receives some or all of only the second uplink control information on the overlapping time domain resource of the time domain resource corresponding to the first uplink control information and the time domain resource corresponding to the second uplink control information.

The situation 2 is also specifically described below by using FIG. 7 as an example. As shown in FIG. 7, it is assumed that a length of the time domain resource corresponding to the first uplink control information is two symbols specifically corresponding to a symbol 0 and a symbol 1 that are used to transmit the first uplink control information; and A length of the time domain resource corresponding to the second uplink control information is four symbols specifically corresponding to symbols 0, 1, 2, and 3 that are used to transmit the second uplink control information. The time domain resource corresponding to the first uplink control information overlaps with the time domain resource corresponding to the second uplink control information on the symbol 0 and the symbol 1. The symbol 0 and the symbol 1 on the uplink carrier are indicated by using 7209, and the symbol 2 and the symbol 3 on the uplink carrier are indicated by using 7210. In the example shown in FIG. 7, the resource corresponding to the first uplink control information does not overlap with the resource corresponding to the second uplink control information in frequency domain. The user equipment sends some or all of the second uplink control information on the overlapping time domain resource of the time domain resource corresponding to the first uplink control information and the time domain resource corresponding to the second uplink control information, for example, on the symbols indicated by 7209 in FIG. 7.

Correspondingly, the base station receives some or all of the second uplink control information on the overlapping time domain resource such as the symbols indicated by 7209 in FIG. 7. If some of the time domain resource corresponding to the first uplink control information overlaps with some of the time domain resource corresponding to the second uplink control information, the base station receives some or all of the first uplink control information on a time domain resource that does not include the overlapping time domain resource and that is in the time domain resource corresponding to the first uplink control information.

Optionally, that the base station transmits some or all of the second uplink control information on the overlapping time domain resource may be that the base station receives some or all of the second uplink control information on a resource that corresponds to the first uplink control information and that is in the overlapping time domain resource. For example, the base station receives some or all of the second uplink control information on a resource indicated by 72091 in FIG. 7.

Optionally, that the base station receives some or all of the second uplink control information on the overlapping time domain resource may be that the base station receives some or all of the second uplink control information on a resource that corresponds to the second uplink control information and that is in the overlapping time domain resource. For example, the base station receives some or all of the second uplink control information on a resource indicated by 72092 in FIG. 7.

Situation 3: The third uplink control information includes the fourth uplink control information and the fifth uplink control information. That is, the third uplink control information includes some or all of the first uplink control information, and some or all of the second uplink control information.

That is, the base station receives some or all of the first uplink control information and some or all of the second uplink control information on the overlapping time domain resource of the time domain resource corresponding to the first uplink control information and the time domain resource corresponding to the second uplink control information.

The situation 3 is also specifically described below by using FIG. 7 as an example. As shown in FIG. 7, it is assumed that a length of the time domain resource corresponding to the first uplink control information is two symbols specifically corresponding to a symbol 0 and a symbol 1 that are used to transmit the first uplink control information; and A length of the time domain resource corresponding to the second uplink control information is four symbols specifically corresponding to symbols 0, 1, 2, and 3 that are used to transmit the second uplink control information. The time domain resource corresponding to the first uplink control information overlaps with the time domain resource corresponding to the second uplink control information on the symbol 0 and the symbol 1. The symbol 0 and the symbol 1 on the uplink carrier are indicated by using 7209, and the symbol 2 and the symbol 3 on the uplink carrier are indicated by using 7210. In the example shown in FIG. 7, the resource corresponding to the first uplink control information does not overlap with the resource corresponding to the second uplink control information in frequency domain. The user equipment transmits some or all of the first uplink control information and some or all of the second uplink control information on the overlapping time domain resource of the time domain resource corresponding to the first uplink control information and the time domain resource corresponding to the second uplink control information, for example, on the symbols indicated by 7209 in FIG. 7.

Optionally, the user equipment transmits some or all of the first uplink control information and some or all of the second uplink control information on a resource that corresponds to the first uplink control information and that is in the overlapping time domain resource. For example, the user equipment transmits some or all of the first uplink control information and some or all of the second uplink control information on a resource indicated by 72091 in FIG. 7. Correspondingly, the base station receives some or all of the first uplink control information and some or all of the second uplink control information on a resource that corresponds to the first uplink control information and that is in the overlapping time domain resource. For example, the base station receives some or all of the first uplink control information and some or all of the second uplink control information on a resource indicated by 72091 in FIG. 7.

Optionally, the user equipment transmits some or all of the first uplink control information and some or all of the second uplink control information on a resource that corresponds to the second uplink control information and that is in the overlapping time domain resource. For example, the user equipment transmits some or all of the first uplink control information and some or all of the second uplink control information on a resource indicated by 72092 in FIG. 7. Correspondingly, the base station receives some or all of the first uplink control information and some or all of the second uplink control information on a resource that corresponds to the second uplink control information and that is in the overlapping time domain resource. For example, the base station receives some or all of the first uplink control information and some or all of the second uplink control information on a resource indicated by 72092 in FIG. 7.

Optionally, the user equipment transmits some or all of the first uplink control information on a resource that corresponds to the first uplink control information and that is in the overlapping time domain resource, and transmits some or all of the second uplink control information on a resource that corresponds to the second uplink control information and that is in the overlapping time domain resource. For example, the user equipment transmits some or all of the first uplink control information on a resource indicated by 72091 in FIG. 7, and transmits some or all of the second uplink control information on a resource indicated by 72092 in FIG. 7. Correspondingly, the base station receives some or all of the first uplink control information on a resource that corresponds to the first uplink control information and that is in the overlapping time domain resource, and receives some or all of the second uplink control information on a resource that corresponds to the second uplink control information and that is in the overlapping time domain resource. For example, the base station receives some or all of the first uplink control information on a resource indicated by 72091 in FIG. 7, and receives some or all of the second uplink control information on a resource indicated by 72092 in FIG. 7.

Optionally, that the base station receives uplink control information may be that the base station receives the uplink control information based on a code resource and/or frequency resource corresponding to the uplink control information. Optionally, the base station demodulates and decodes the received uplink control information. Further, optionally, the base station demodulates and decodes the received uplink control information based on a modulation and coding manner and/or rate matching corresponding to the uplink control information.

It should be noted that, in Embodiment 1 of the present application, the user equipment may use a plurality of the three situations to send the third uplink control information, so as to resolve an uplink control information transmission problem when there are a plurality of pieces of uplink control information corresponding to time domain resources of different lengths and the time domain resources corresponding to the plurality of pieces of uplink control information overlap. Correspondingly, the base station should also use a plurality of the three situations to receive the third uplink control information, and a specific receiving method is similar to the receiving method described above. Details are not described herein again.

Optionally, before the base station receives the third uplink control information, the method further includes:

sending, by the base station, indication information to user equipment, where the indication information includes at least one of the following information:

resource allocation information of the time domain resource corresponding to the first uplink control information;

resource allocation information of the time domain resource corresponding to the second uplink control information;

indication information of the overlapping time domain resource; and indication information of the third uplink control information.

It should be noted that, in the method provided in this embodiment of the present application, a method for included content, an indication form, a bearer resource, a sending manner, and the like of the foregoing information is the same as a method for included content, an indication form, a bearer resource, a sending manner, and the like of the foregoing information that is described in Embodiment 1 of the present application. Details are not described herein again.

This embodiment of the present application provides an uplink control information transmission method. When there are at least two pieces of uplink control information corresponding to time domain resources of different lengths and the time domain resources corresponding to the at least two pieces of uplink control information overlap, some or all of only one of the at least two pieces of uplink control information is transmitted, or some or all of each of two pieces of uplink control information is transmitted by using a multiplexing method, so as to ensure that uplink control information of a higher priority is transmitted, or ensure demodulation performance of uplink control information of a higher priority.

Embodiment 4

Figure 14:
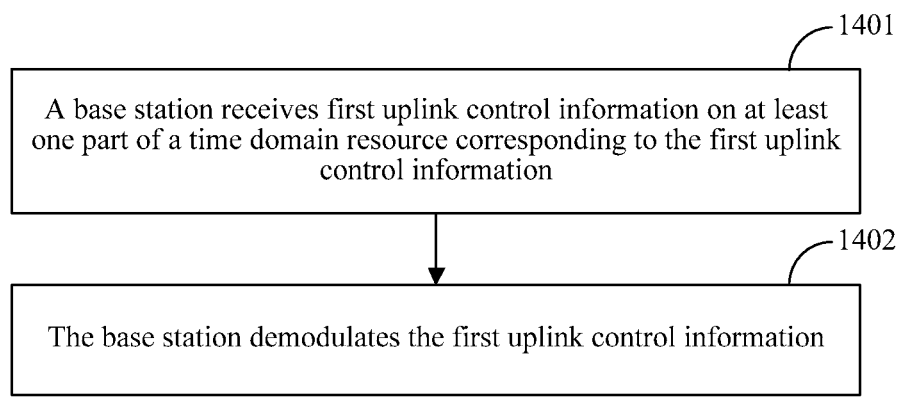
FIG. 14 is a flowchart of an uplink control information transmission method according to an embodiment of the present invention.

This embodiment of the present application further provides an uplink control information transmission method, applied to a base station. FIG. 14 is a flowchart of the uplink control information transmission method according to this embodiment of the present application. As shown in FIG. 14, the method includes the following steps.

Step 1401. The base station receives first uplink control information on at least one part of a time domain resource corresponding to the first uplink control information.

The first uplink control information includes at least one of hybrid automatic repeat request information, channel state information, and scheduling request information, the time domain resource corresponding to the first uplink control information includes M preset time domain resources, and M is an integer greater than or equal to one.

The at least one part of the time domain resource corresponding to the first uplink control information includes at least one preset time domain resource, and user equipment sends all information of the first uplink control information on each of the M preset time domain resources.

A length corresponding to each of the M preset time domain resources is less than six symbols.

Step 1402. The base station demodulates the first uplink control information.

It should be noted that, in the method provided in this embodiment of the present application, content included in the first uplink control information, a length of the time domain resource corresponding to the first uplink control information, a quantity of the preset time domain resources included in the time domain resource corresponding to the first uplink control information, a method for determining the length of the time domain resource corresponding to the first uplink control information, a PUCCH channel structure corresponding to the first uplink control information, and the like are the same as content included in the first uplink control information, a length of the time domain resource corresponding to the first uplink control information, a quantity of the preset time domain resources included in the time domain resource corresponding to the first uplink control information, a method for determining the length of the time domain resource corresponding to the first uplink control information, a PUCCH channel structure corresponding to the first uplink control information, and the like that are described in Embodiment 2 of the present application. Details are not described herein again.

It should be noted that, in the method provided in this embodiment of the present application, a length of a preset time domain resource, a location of a preset time domain resource, a method for sending a preset time domain resource, and the like are the same as a length of a preset time domain resource, a location of a preset time domain resource, a method for sending a preset time domain resource, and the like that are described in Embodiment 2 of the present application. Details are not described herein again.

Optionally, the method further includes:

receiving, by the base station, second uplink control information on a time domain resource corresponding to the second uplink control information, where the second uplink control information includes at least one of hybrid automatic repeat request information, channel state information, and scheduling request information, and a length of the time domain resource corresponding to the first uplink control information is less than a length of the time domain resource corresponding to the second uplink control information; and when the time domain resource corresponding to the first uplink control information overlaps with the time domain resource corresponding to the second uplink control information, receiving, by the base station, third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

It should be noted that, in the method provided in this embodiment of the present application, content included in the second uplink control information, the length of the time domain resource corresponding to the second uplink control information, a method for determining the length of the time domain resource corresponding to the second uplink control information, and the like are the same as content included in the second uplink control information, the length of the time domain resource corresponding to the second uplink control information, a method for determining the length of the time domain resource corresponding to the second uplink control information, and the like that are described in Embodiment 2 of the present application. Details are not described herein again.

It should be noted that, in the method provided in this embodiment of the present application, a method for included content, an indication form, a bearer resource, a sending manner, and the like of the third uplink control information is the same as a method for included content, an indication form, a bearer resource, a sending manner, and the like of the third uplink control information that is described in Embodiment 2 of the present application. Details are not described herein again.

It should be noted that, the uplink control information transmission implementation method provided in this embodiment of the present application is the same as the uplink control information transmission implementation method described in Embodiment 2 of the present application. Details are not described herein again.

Based on the uplink control information transmission channel structure or method that is provided in this embodiment of the present application, uplink control information can still be correctly demodulated when the uplink control information is transmitted on some of a time domain resource that corresponds to the uplink control information and that is pre-allocated for the uplink control information. Further, when there are a plurality of pieces of uplink control information corresponding to time domain resources of different lengths and the time domain resources corresponding to the plurality of pieces of uplink control information overlap, the plurality of pieces of uplink control information may be transmitted and correctly demodulated based on the method provided in this embodiment of the present application.

Embodiment 5

Based on a same inventive idea as that of Embodiment 1, this embodiment of the present application further provides user equipment for transmitting uplink control information. A method corresponding to the user equipment for transmitting uplink control information is the uplink control information transmission method of Embodiment 1 of the present application. Therefore, for implementation of the user equipment for transmitting uplink control information of this embodiment of the present application, refer to implementation of the method. Repetitive details are not described herein again.

Figure 15:
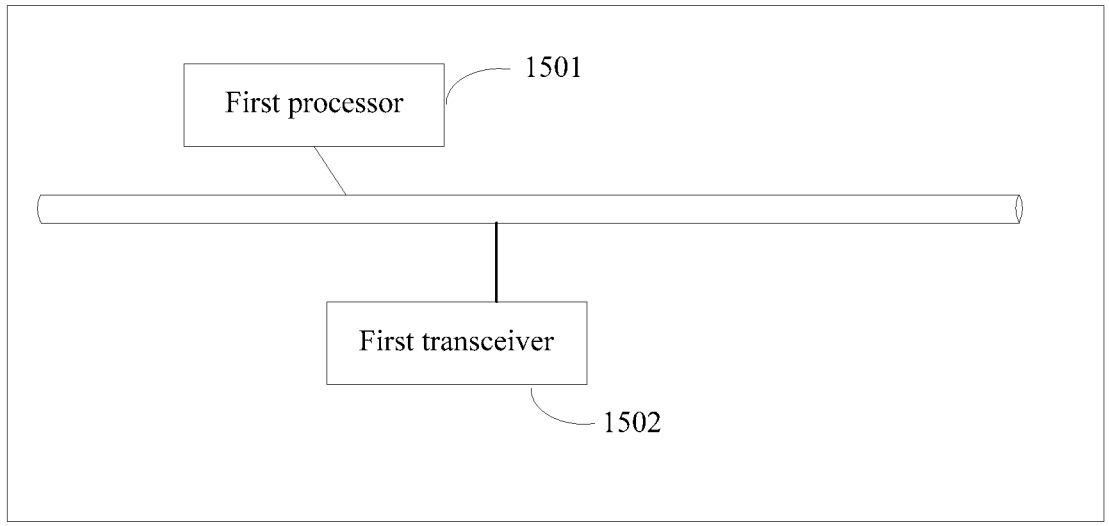
FIG. 15 is a schematic diagram of an uplink control information transmission apparatus according to an embodiment of the present invention.

As shown in FIG. 15, an uplink control information transmission apparatus of the user equipment includes a first processor 1501 and a first transceiver 1502.

The first processor 1501 is configured to determine first uplink control information and second uplink control information, where a length of a time domain resource corresponding to the first uplink control information is less than a length of a time domain resource corresponding to the second uplink control information, and the first uplink control information or the second uplink control information includes at least one of hybrid automatic repeat request information, channel state information, and scheduling request information; and the first transceiver 1502 is configured to transmit the first uplink control information on the time domain resource corresponding to the first uplink control information, and transmit the second uplink control information on the time domain resource corresponding to the second uplink control information; and when the time domain resource corresponding to the first uplink control information overlaps with the time domain resource corresponding to the second uplink control information, transmit third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the length of the time domain resource corresponding to the first uplink control information is a first transmission time interval time length, and the length of the time domain resource corresponding to the second uplink control information is a second transmission time interval time length;

the first transmission time interval time length is less than the second transmission time interval time length; and the first transmission time interval time length is less than one millisecond.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Optionally, the third uplink control information includes the fourth uplink control information, and the first transceiver 1502 is further configured to send the fifth uplink control information on a time domain resource that does not include the overlapping time domain resource and that is in the time domain resource corresponding to the second uplink control information.

Optionally, the third uplink control information includes the fifth uplink control information, and the first transceiver 1502 is further configured to send the fourth uplink control information on a time domain resource that does not include the overlapping time domain resource and that is in the time domain resource corresponding to the first uplink control information.

Optionally, the first transceiver 1502 is further configured to send the third uplink control information on the time domain resource corresponding to the first uplink control information.

Optionally, the first transceiver 1502 is further configured to send the third uplink control information on the time domain resource corresponding to the second uplink control information.

Optionally, the first transceiver 1502 is further configured to receive indication information sent by a base station, where the indication information includes at least one of the following information:

resource allocation information of the time domain resource corresponding to the first uplink control information;

resource allocation information of the time domain resource corresponding to the second uplink control information;

indication information of the overlapping time domain resource; and indication information of the third uplink control information.

Based on the uplink control information transmission apparatus of this embodiment of the present application, when there are at least two pieces of uplink control information corresponding to time domain resources of different lengths and the time domain resources corresponding to the at least two pieces of uplink control information overlap, some or all of only one of the at least two pieces of uplink control information is transmitted, or some or all of each of two pieces of uplink control information is transmitted by using a multiplexing method, so as to ensure that uplink control information of a higher priority is transmitted, or ensure demodulation performance of uplink control information of a higher priority.

Embodiment 6

Based on a same inventive idea as that of Embodiment 3, this embodiment of the present application further provides a base station for transmitting uplink control information. A method corresponding to the base station for transmitting uplink control information is the uplink control information transmission method of Embodiment 3 of the present application. Therefore, for implementation of the base station for transmitting uplink control information of this embodiment of the present application, refer to implementation of the method. Repetitive details are not described herein again.

An uplink control information transmission apparatus of the base station may include a transceiver and a processor.

In this embodiment of the present application, the transceiver is configured to receive first uplink control information on a time domain resource corresponding to the first uplink control information, and receive second uplink control information on a time domain resource corresponding to the second uplink control information; and the processor is configured to demodulate the received first uplink control information or second uplink control information, where a length of the time domain resource corresponding to the first uplink control information is less than a length of the time domain resource corresponding to the second uplink control information, and the first uplink control information or the second uplink control information includes at least one of hybrid automatic repeat request information, channel state information, and scheduling request information; and when the time domain resource corresponding to the first uplink control information overlaps with the time domain resource corresponding to the second uplink control information, the transceiver is further configured to receive third uplink control information on the overlapping time domain resource; and the processor is further configured to demodulate the received third uplink control information, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the length of the time domain resource corresponding to the first uplink control information is a first transmission time interval time length, and the length of the time domain resource corresponding to the second uplink control information is a second transmission time interval time length;

the first transmission time interval time length is less than the second transmission time interval time length; and the first transmission time interval time length is less than one millisecond.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Optionally, the third uplink control information includes the fourth uplink control information, the transceiver is further configured to receive the fifth uplink control information on a time domain resource that does not include the overlapping time domain resource and that is in the time domain resource corresponding to the second uplink control information, and the processor is further configured to demodulate the received fifth uplink control information.

Optionally, the third uplink control information includes the fifth uplink control information, the transceiver is further configured to receive the fourth uplink control information on a time domain resource that does not include the overlapping time domain resource and that is in the time domain resource corresponding to the first uplink control information, and the processor is further configured to demodulate the received fourth uplink control information.

Optionally, the third uplink control information includes the fourth uplink control information and the fifth uplink control information, and the transceiver is further configured to perform at least one of the following:

receiving the third uplink control information on a resource that corresponds to the first uplink control information and that is in the overlapping time domain resource; and receiving the third uplink control information on a resource that corresponds to the second uplink control information and that is in the overlapping time domain resource.

Correspondingly, the processor is further configured to demodulate the received third uplink control information.

Optionally, the transceiver is further configured to send indication information to user equipment, where the indication information includes at least one of the following information:

resource allocation information of the time domain resource corresponding to the first uplink control information;

resource allocation information of the time domain resource corresponding to the second uplink control information;

indication information of the overlapping time domain resource; and indication information of the third uplink control information.

Based on the uplink control information transmission apparatus of this embodiment of the present application, when there are at least two pieces of uplink control information corresponding to time domain resources of different lengths and the time domain resources corresponding to the at least two pieces of uplink control information overlap, some or all of only one of the at least two pieces of uplink control information is transmitted, or some or all of each of two pieces of uplink control information is transmitted by using a multiplexing method, so as to ensure that uplink control information of a higher priority is transmitted, or ensure demodulation performance of uplink control information of a higher priority.

Embodiment 7

Based on a same inventive idea as that of Embodiment 1, this embodiment of the present application further provides an uplink control information transmission apparatus. A method corresponding to the uplink control information transmission apparatus is the uplink control information transmission method of Embodiment 1 of the present application. Therefore, for implementation of the uplink control information transmission apparatus of this embodiment of the present application, refer to implementation of the method. Repetitive details are not described herein again.

Figure 16:
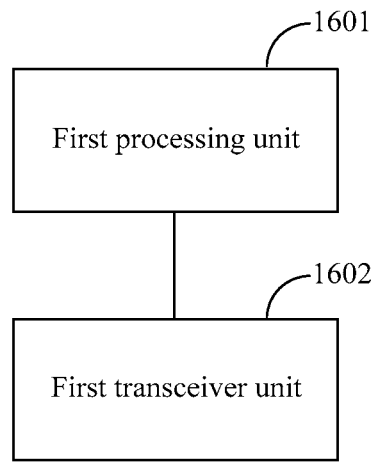
FIG. 16 is a schematic diagram of an uplink control information transmission apparatus according to an embodiment of the present invention.

FIG. 16 is a schematic diagram of the uplink control information transmission apparatus according to this embodiment of the present application. As shown in FIG. 16, the apparatus is applied to user equipment. The apparatus includes:

a first processing unit 1601, configured to determine first uplink control information and second uplink control information, where a length of a time domain resource corresponding to the first uplink control information is less than a length of a time domain resource corresponding to the second uplink control information, and the first uplink control information or the second uplink control information includes at least one of hybrid automatic repeat request information, channel state information, and scheduling request information; and a first transceiver unit 1602, configured to transmit the first uplink control information on the time domain resource corresponding to the first uplink control information, and transmit the second uplink control information on the time domain resource corresponding to the second uplink control information; and when the time domain resource corresponding to the first uplink control information overlaps with the time domain resource corresponding to the second uplink control information, transmit third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the length of the time domain resource corresponding to the first uplink control information is a first transmission time interval time length, and the length of the time domain resource corresponding to the second uplink control information is a second transmission time interval time length;

the first transmission time interval time length is less than the second transmission time interval time length; and the first transmission time interval time length is less than one millisecond.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Optionally, the third uplink control information includes the fourth uplink control information, and the first transceiver unit 1602 is further configured to send the fifth uplink control information on a time domain resource that does not include the overlapping time domain resource and that is in the time domain resource corresponding to the second uplink control information.

Optionally, the third uplink control information includes the fifth uplink control information, and the first transceiver unit 1602 is further configured to send the fourth uplink control information on a time domain resource that does not include the overlapping time domain resource and that is in the time domain resource corresponding to the first uplink control information.

Optionally, the first transceiver unit 1602 is further configured to send the third uplink control information on the time domain resource corresponding to the first uplink control information.

Optionally, the first transceiver unit 1602 is further configured to send the third uplink control information on the time domain resource corresponding to the second uplink control information.

Optionally, the first transceiver unit 1602 is further configured to receive indication information sent by a base station, where the indication information includes at least one of the following information:

resource allocation information of the time domain resource corresponding to the first uplink control information;

resource allocation information of the time domain resource corresponding to the second uplink control information;

indication information of the overlapping time domain resource; and indication information of the third uplink control information.

Based on the uplink control information transmission apparatus of this embodiment of the present application, when there are at least two pieces of uplink control information corresponding to time domain resources of different lengths and the time domain resources corresponding to the at least two pieces of uplink control information overlap, some or all of only one of the at least two pieces of uplink control information is transmitted, or some or all of each of two pieces of uplink control information is transmitted by using a multiplexing method, so as to ensure that uplink control information of a higher priority is transmitted, or ensure demodulation performance of uplink control information of a higher priority.

Embodiment 8

Based on a same inventive idea as that of Embodiment 3, this embodiment of the present application further provides an uplink control information transmission apparatus. A method corresponding to the uplink control information transmission apparatus is the uplink control information transmission method of Embodiment 3 of the present application. Therefore, for implementation of the uplink control information transmission apparatus of this embodiment of the present application, refer to implementation of the method. Repetitive details are not described herein again.

This embodiment of the present application provides the uplink control information transmission apparatus, applied to a base station. The apparatus includes:

a transceiver unit, configured to receive first uplink control information on a time domain resource corresponding to the first uplink control information, and receive second uplink control information on a time domain resource corresponding to the second uplink control information; and a processing unit, configured to demodulate the received first uplink control information or second uplink control information, where a length of the time domain resource corresponding to the first uplink control information is less than a length of the time domain resource corresponding to the second uplink control information, and the first uplink control information or the second uplink control information includes at least one of hybrid automatic repeat request information, channel state information, and scheduling request information; and when the time domain resource corresponding to the first uplink control information overlaps with the time domain resource corresponding to the second uplink control information, the transceiver unit is further configured to receive third uplink control information on the overlapping time domain resource; and the processing unit is further configured to demodulate the received third uplink control information, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the length of the time domain resource corresponding to the first uplink control information is a first transmission time interval time length, and the length of the time domain resource corresponding to the second uplink control information is a second transmission time interval time length;

the first transmission time interval time length is less than the second transmission time interval time length; and the first transmission time interval time length is less than one millisecond.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Optionally, the third uplink control information includes the fourth uplink control information, and the transceiver unit is further configured to:

receive the fifth uplink control information on a time domain resource that does not include the overlapping time domain resource and that is in the time domain resource corresponding to the second uplink control information; and the processing unit is further configured to demodulate the received fifth uplink control information.

Optionally, the third uplink control information includes the fifth uplink control information, and the transceiver unit is further configured to:

receive the fourth uplink control information on a time domain resource that does not include the overlapping time domain resource and that is in the time domain resource corresponding to the first uplink control information; and the processing unit is further configured to demodulate the received fourth uplink control information.

Optionally, the third uplink control information includes the fourth uplink control information and the fifth uplink control information, and the transceiver unit is further configured to perform at least one of the following:

receiving the third uplink control information on a resource that corresponds to the first uplink control information and that is in the overlapping time domain resource; and receiving the third uplink control information on a resource that corresponds to the second uplink control information and that is in the overlapping time domain resource.

Correspondingly, the processing unit is further configured to demodulate the received third uplink control information.

Optionally, the transceiver unit is further configured to send indication information to user equipment, where the indication information includes at least one of the following information:

resource allocation information of the time domain resource corresponding to the first uplink control information;

resource allocation information of the time domain resource corresponding to the second uplink control information;

indication information of the overlapping time domain resource; and indication information of the third uplink control information.

Based on the uplink control information transmission apparatus of this embodiment of the present application, when there are at least two pieces of uplink control information corresponding to time domain resources of different lengths and the time domain resources corresponding to the at least two pieces of uplink control information overlap, some or all of only one of the at least two pieces of uplink control information is transmitted, or some or all of each of two pieces of uplink control information is transmitted by using a multiplexing method, so as to ensure that uplink control information of a higher priority is transmitted, or ensure demodulation performance of uplink control information of a higher priority.

Embodiment 9

Based on a same inventive idea as that of Embodiment 2, this embodiment of the present application further provides user equipment for transmitting uplink control information. A method corresponding to the user equipment for transmitting uplink control information is the uplink control information transmission method of Embodiment 2 of the present application. Therefore, for implementation of the user equipment for transmitting uplink control information of this embodiment of the present application, refer to implementation of the method. Repetitive details are not described herein again.

Figure 17:
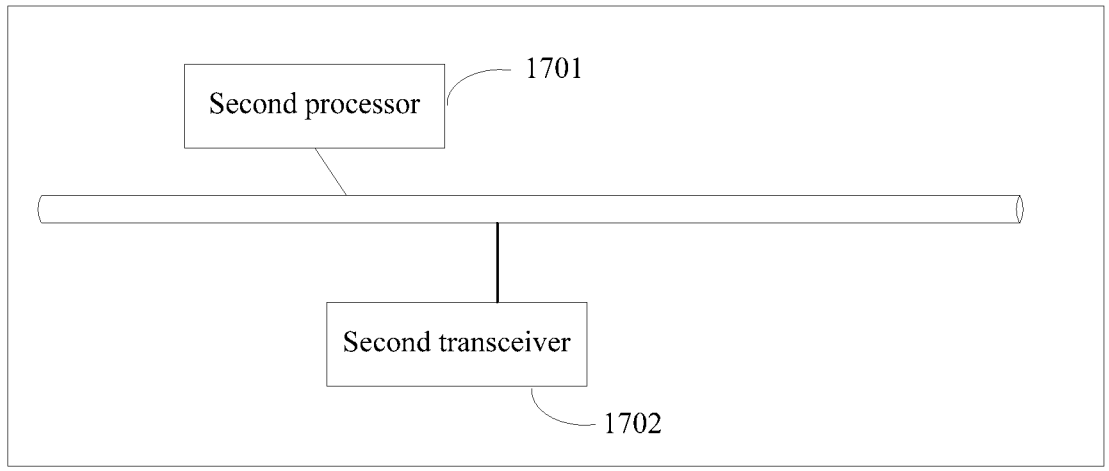
FIG. 17 is a schematic diagram of an uplink control information transmission apparatus according to an embodiment of the present invention.

FIG. 17 is a schematic diagram of an uplink control information transmission apparatus according to this embodiment of the present application. As shown in FIG. 17, the apparatus is applied to user equipment. The apparatus includes:

a second processor 1701, configured to determine first uplink control information, where a length of a time domain resource corresponding to the first uplink control information is less than one millisecond, the time domain resource corresponding to the first uplink control information includes M preset time domain resources, M is an integer greater than or equal to one, and the first uplink control information includes at least one of hybrid automatic repeat request information, channel state information, and scheduling request information; and a second transceiver 1702, configured to send all information of the first uplink control information on each of the M preset time domain resources, where a length corresponding to each of the M preset time domain resources is less than six symbols.

Optionally, that the length corresponding to each of the M preset time domain resources is less than six symbols includes:

the length corresponding to each of the M preset time domain resources is one symbol;

the length corresponding to each of the M preset time domain resources is two symbols; or the length corresponding to each of the M preset time domain resources is three symbols.

Optionally, the second processor 1701 is further configured to determine second uplink control information, where the second uplink control information includes at least one of hybrid automatic repeat request information, channel state information, and scheduling request information;

the second transceiver 1702 is further configured to send the second uplink control information on a time domain resource corresponding to the second uplink control information, where the length of the time domain resource corresponding to the first uplink control information is less than a length of the time domain resource corresponding to the second uplink control information; and the second transceiver 1702 is further configured to: when the time domain resource corresponding to the first uplink control information overlaps with the time domain resource corresponding to the second uplink control information, transmit third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Based on the uplink control information transmission channel structure or method that is provided in this embodiment of the present application, uplink control information can still be correctly demodulated when the uplink control information is transmitted on some of a time domain resource that corresponds to the uplink control information and that is pre-allocated for the uplink control information. Further, when there are a plurality of pieces of uplink control information corresponding to time domain resources of different lengths and the time domain resources corresponding to the plurality of pieces of uplink control information overlap, the plurality of pieces of uplink control information may be transmitted and correctly demodulated based on the method provided in this embodiment of the present application.

Embodiment 10

Based on a same inventive idea as that of Embodiment 4, this embodiment of the present application further provides a base station for transmitting uplink control information. A method corresponding to the base station for transmitting uplink control information is the uplink control information transmission method of Embodiment 4 of the present application. Therefore, for implementation of the base station for transmitting uplink control information of this embodiment of the present application, refer to implementation of the method. Repetitive details are not described herein again.

This embodiment of the present application provides an uplink control information transmission apparatus, characterized in that the apparatus is applied to the base station. The apparatus includes:

a transceiver, configured to receive first uplink control information on at least one part of a time domain resource corresponding to the first uplink control information; and a processor, configured to demodulate the received first uplink control information, where the first uplink control information includes at least one of hybrid automatic repeat request information, channel state information, and scheduling request information, the time domain resource corresponding to the first uplink control information includes M preset time domain resources, and M is an integer greater than or equal to one;

the at least one part of the time domain resource corresponding to the first uplink control information includes at least one preset time domain resource, and the at least one preset time domain resource includes all information of the first uplink control information; and a length corresponding to each of the M preset time domain resources is less than six symbols.

Optionally, that the length corresponding to each of the M preset time domain resources is less than six symbols includes:

the length corresponding to each of the M preset time domain resources is one symbol;

the length corresponding to each of the M preset time domain resources is two symbols; or the length corresponding to each of the M preset time domain resources is three symbols.

Optionally, the transceiver is further configured to:

receive second uplink control information on a time domain resource corresponding to the second uplink control information, where the second uplink control information includes at least one of hybrid automatic repeat request information, channel state information, and scheduling request information, and a length of the time domain resource corresponding to the first uplink control information is less than a length of the time domain resource corresponding to the second uplink control information;

the processor is further configured to demodulate the received second uplink control information; and when the time domain resource corresponding to the first uplink control information overlaps with the time domain resource corresponding to the second uplink control information, the transceiver is further configured to receive third uplink control information on the overlapping time domain resource; and the processor is further configured to demodulate the third uplink control information, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Based on the uplink control information transmission channel structure or method that is provided in this embodiment of the present application, uplink control information can still be correctly demodulated when the uplink control information is transmitted on some of a time domain resource that corresponds to the uplink control information and that is pre-allocated for the uplink control information. Further, when there are a plurality of pieces of uplink control information corresponding to time domain resources of different lengths and the time domain resources corresponding to the plurality of pieces of uplink control information overlap, the plurality of pieces of uplink control information may be transmitted and correctly demodulated based on the method provided in this embodiment of the present application.

Embodiment 11

Based on a same inventive idea as that of Embodiment 2, this embodiment of the present application further provides an uplink control information transmission apparatus. A method corresponding to the uplink control information transmission apparatus is the uplink control information transmission method of Embodiment 2 of the present application. Therefore, for implementation of the uplink control information transmission apparatus of this embodiment of the present application, refer to implementation of the method. Repetitive details are not described herein again.

Figure 18:
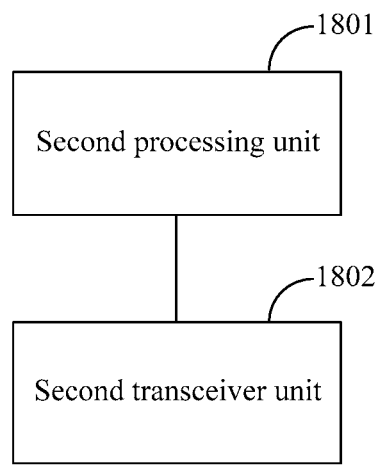
FIG. 18 is a schematic diagram of an uplink control information transmission apparatus according to an embodiment of the present invention.

FIG. 18 is a schematic diagram of the uplink control information transmission apparatus according to this embodiment of the present application. As shown in FIG. 18, the apparatus is applied to user equipment. The apparatus includes:

a second processing unit 1801, configured to determine first uplink control information, where a length of a time domain resource corresponding to the first uplink control information is less than one millisecond, the time domain resource corresponding to the first uplink control information includes M preset time domain resources, M is an integer greater than or equal to one, and the first uplink control information includes at least one of hybrid automatic repeat request information, channel state information, and scheduling request information; and a second transceiver unit 1802, configured to send all information of the first uplink control information on each of the M preset time domain resources, where a length corresponding to each of the M preset time domain resources is less than six symbols.

Optionally, that the length corresponding to each of the M preset time domain resources is less than six symbols includes:

the length corresponding to each of the M preset time domain resources is one symbol;

the length corresponding to each of the M preset time domain resources is two symbols; or the length corresponding to each of the M preset time domain resources is three symbols.

Optionally, the second processing unit 1801 is further configured to determine second uplink control information, where the second uplink control information includes at least one of hybrid automatic repeat request information, channel state information, and scheduling request information;

the second transceiver unit 1802 is further configured to send the second uplink control information on a time domain resource corresponding to the second uplink control information, where the length of the time domain resource corresponding to the first uplink control information is less than a length of the time domain resource corresponding to the second uplink control information; and the second transceiver unit 1802 is further configured to: when the time domain resource corresponding to the first uplink control information overlaps with the time domain resource corresponding to the second uplink control information, transmit third uplink control information on the overlapping time domain resource, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Based on the uplink control information transmission channel structure or method that is provided in this embodiment of the present application, uplink control information can still be correctly demodulated when the uplink control information is transmitted on some of a time domain resource that corresponds to the uplink control information and that is pre-allocated for the uplink control information. Further, when there are a plurality of pieces of uplink control information corresponding to time domain resources of different lengths and the time domain resources corresponding to the plurality of pieces of uplink control information overlap, the plurality of pieces of uplink control information may be transmitted and correctly demodulated based on the method provided in this embodiment of the present application.

Embodiment 12

Based on a same inventive idea as that of Embodiment 4, this embodiment of the present application further provides an uplink control information transmission apparatus. A method corresponding to the uplink control information transmission apparatus is the uplink control information transmission method of Embodiment 4 of the present application. Therefore, for implementation of the uplink control information transmission apparatus of this embodiment of the present application, refer to implementation of the method. Repetitive details are not described herein again.

This embodiment of the present application provides the uplink control information transmission apparatus, characterized in that the apparatus is applied to a base station. The apparatus includes:

a transceiver unit, configured to receive first uplink control information on at least one part of a time domain resource corresponding to the first uplink control information; and a processing unit, configured to demodulate the received first uplink control information, where the first uplink control information includes at least one of hybrid automatic repeat request information, channel state information, and scheduling request information, the time domain resource corresponding to the first uplink control information includes M preset time domain resources, and M is an integer greater than or equal to one;

the at least one part of the time domain resource corresponding to the first uplink control information includes at least one preset time domain resource, and the at least one preset time domain resource includes all information of the first uplink control information; and a length corresponding to each of the M preset time domain resources is less than six symbols.

Optionally, that the length corresponding to each of the M preset time domain resources is less than six symbols includes:

the length corresponding to each of the M preset time domain resources is one symbol;

the length corresponding to each of the M preset time domain resources is two symbols; or the length corresponding to each of the M preset time domain resources is three symbols.

Optionally, the transceiver unit is further configured to:

receive second uplink control information on a time domain resource corresponding to the second uplink control information, where the second uplink control information includes at least one of hybrid automatic repeat request information, channel state information, and scheduling request information, and a length of the time domain resource corresponding to the first uplink control information is less than a length of the time domain resource corresponding to the second uplink control information;

the processing unit is further configured to demodulate the received second uplink control information; and when the time domain resource corresponding to the first uplink control information overlaps with the time domain resource corresponding to the second uplink control information, the transceiver unit is further configured to receive third uplink control information on the overlapping time domain resource; and the processing unit is further configured to demodulate the third uplink control information, where the third uplink control information includes at least one of fourth uplink control information and fifth uplink control information, where the fourth uplink control information includes some information of the first uplink control information or all information of the first uplink control information, and the fifth uplink control information includes some information of the second uplink control information or all information of the second uplink control information.

Optionally, the third uplink control information includes the fourth uplink control information, where the first uplink control information includes at least one of the hybrid automatic repeat request information or the scheduling request information, and the second uplink control information includes the channel state information and does not include the hybrid automatic repeat request information and the scheduling request information; or the third uplink control information includes the fifth uplink control information, the second uplink control information includes at least one of the hybrid automatic repeat request information or the scheduling request information, and the first uplink control information includes the channel state information and does not include the hybrid automatic repeat request information and the scheduling request information.

Based on the uplink control information transmission channel structure or method that is provided in this embodiment of the present application, uplink control information can still be correctly demodulated when the uplink control information is transmitted on some of a time domain resource that corresponds to the uplink control information and that is pre-allocated for the uplink control information. Further, when there are a plurality of pieces of uplink control information corresponding to time domain resources of different lengths and the time domain resources corresponding to the plurality of pieces of uplink control information overlap, the plurality of pieces of uplink control information may be transmitted and correctly demodulated based on the method provided in this embodiment of the present application.

The embodiments of the present application provide an uplink control information transmission method and apparatus. When there are at least two pieces of uplink control information corresponding to time domain resources of different lengths and the time domain resources corresponding to the at least two pieces of uplink control information overlap, some or all of only one of the at least two pieces of uplink control information is transmitted, or some or all of each of two pieces of uplink control information is transmitted by using a multiplexing method, so as to ensure that uplink control information of a higher priority is transmitted, or ensure demodulation performance of uplink control information of a higher priority. The present application can resolve an uplink control information transmission problem when there are a plurality of pieces of uplink control information corresponding to time domain resources of different lengths and a conflict occurs between the time domain resources corresponding to the plurality of pieces of uplink control information, thereby improving transmission efficiency.

The described device embodiment is merely an example. The functional units described as separate parts may or may not be physically separate, and parts displayed as functional units may or may not be physical units, may be located in one position, or may be distributed on a plurality of network units. Some or all of the modules may be selected based on actual needs to achieve the objectives of the solutions of the embodiments. A person of ordinary skill in the art may understand and implement the embodiments of the present application without creative efforts.

The present application can be described in the general context of computer executable instructions executed by a computer, for example, a program module. Generally, the program unit includes a routine, program, object, component, data structure, and the like for executing a particular task or implementing a particular abstract data type. The present application may also be practiced in distributed computing environments in which tasks are performed by remote processing devices that are connected by using a communications network. In a distributed computing environment, program modules may be located in both local and remote computer storage media including storage devices.

A person of ordinary skill in the art may understand that all or a part of the steps of the method embodiments may be implemented by a program instructing related hardware. The program may be stored in a computer readable storage medium, such as a ROM, a RAM, a magnetic disk, or an optical disc.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

In short, the foregoing descriptions are merely examples of embodiments of the present application, but are not intended to limit the protection scope of the present application. Specific examples are used in this specification to describe the principle and implementations of the present application. The descriptions of the foregoing embodiments are merely intended to help understand the method and core idea of the present application. In addition, a person skilled in the art may, based on the idea of the present application, make modifications with respect to the specific implementations and the application scope. Therefore, the content of this specification shall not be construed as a limitation on the present application. Therefore, the content of this specification shall not be construed as a limitation on the present application. Any modification, equivalent replacement, or improvement made without departing from the spirit and principle of the present application shall fall within the protection scope of the present invention.

What is claimed is:

1. A communication method, wherein the method comprises:

determining, by a terminal device, first uplink control information and second uplink control information, wherein a length of a time domain resource corresponding to the first uplink control information is less than a length of a time domain resource corresponding to the second uplink control information, wherein:

the first uplink control information and the second uplink control information are hybrid automatic repeat request information; or the first uplink control information comprises at least one of channel state information or scheduling request information; and the second uplink control information comprises at least one of hybrid automatic repeat request information, channel state information, and scheduling request information; or the first uplink control information comprises at least two of hybrid automatic repeat request information, channel state information, and scheduling request information, and the second uplink control information comprises at least one of hybrid automatic repeat request information, channel state information, and scheduling request information; and when the time domain resource corresponding to the first uplink control information overlaps with the time domain resource corresponding to the second uplink control information, transmitting, by the terminal device, third uplink control information on the overlapping time domain resource, wherein the third uplink control information comprises some or all of the first uplink control information, and does not comprise the second uplink control information.

2. The method according to claim 1, wherein the length of the time domain resource corresponding to the first uplink control information is less than one millisecond.

3. The method according to claim 1, wherein,
the length of the time domain resource corresponding to the first uplink control information is a first transmission time interval (TTI) time length, and the length of the time domain resource corresponding to the second uplink control information is a second TTI time length, where the first TTI time length is less than the second TTI time length.

4. The method according to claim 1, wherein the third uplink control information comprises some or all of the first uplink control information, and does not comprise the second uplink control information comprises:
the first uplink control information comprises the hybrid automatic repeat request information and the scheduling request information, and the second uplink control information comprises the channel state information and does not comprise the hybrid automatic repeat request information and the scheduling request information; or
the second uplink control information comprises fifth uplink control information, the second uplink control information comprises at least one of the hybrid automatic repeat request information or the scheduling request information, and the first uplink control information comprises the channel state information and does not comprise the hybrid automatic repeat request information and the scheduling request information.

5. The method according to claim 1, wherein the third uplink control information comprises fourth uplink control information, the first uplink control information comprises at least one of the hybrid automatic repeat request information or the scheduling request information, and the second uplink control information comprises the channel state information and does not comprise the hybrid automatic repeat request information and the scheduling request information.

6. The method according to claim 1, wherein priority of the first uplink control information is higher than priority of the second uplink control information.

7. A communication apparatus, wherein the apparatus comprises:
a processor, configured to determine first uplink control information and second uplink control information, wherein a length of a time domain resource corresponding to the first uplink control information is less than a length of a time domain resource corresponding to the second uplink control information, wherein:
the first uplink control information and the second uplink control information are hybrid automatic repeat request information;
the first uplink control information comprises at least one of channel state information or scheduling request information; and the second uplink control information comprises at least one of hybrid automatic repeat request information, channel state information, and scheduling request information; or
the first uplink control information comprises at least two of hybrid automatic repeat request information, channel state information, and scheduling request information, and the second uplink control information comprises at least one of hybrid automatic repeat request information, channel state information, and scheduling request information; and
a transceiver, configured to: when the time domain resource corresponding to the first uplink control information overlaps with the time domain resource corresponding to the second uplink control information, and transmit third uplink control information on the overlapping time domain resource, wherein the third uplink control information comprises some or all of the first uplink control information, and does not comprise the second uplink control information.

8. The apparatus according to claim 7, wherein the length of the time domain resource corresponding to the first uplink control information is less than one millisecond.

9. The apparatus according to claim 7, wherein
the length of the time domain resource corresponding to the first uplink control information is a first transmission time interval (TTI) time length, and the length of the time domain resource corresponding to the second uplink control information is a second TTI time length, where the first TTI time length is less than the second TTI time length.

10. The apparatus according to claim 7, wherein the third uplink control information comprises some or all of the first uplink control information, and does not comprise the second uplink control information comprises:
the first uplink control information comprises the hybrid automatic repeat request information and the scheduling request information, and the second uplink control information comprises the channel state information and does not comprise the hybrid automatic repeat request information and the scheduling request information; or
the second uplink control information comprises fifth uplink control information, the second uplink control information comprises at least one of the hybrid automatic repeat request information or the scheduling request information, and the first uplink control information comprises the channel state information and does not comprise the hybrid automatic repeat request information and the scheduling request information.

11. The apparatus according to claim 7, wherein the third uplink control information comprises fourth uplink control information, the first uplink control information comprises at least one of the hybrid automatic repeat request information or the scheduling request information, and the second uplink control information comprises the channel state information and does not comprise the hybrid automatic repeat request information and the scheduling request information.

12. The apparatus according to claim 7, wherein priority of the first uplink control information is higher than priority of the second uplink control information.

13. The apparatus according to claim 7, wherein the third uplink control information comprises the fourth uplink control information, and the transceiver is further configured to:
send fifth uplink control information on a time domain resource that does not comprise the overlapping time domain resource and that is in the time domain resource corresponding to the second uplink control information.

14. A non-transitory computer readable medium storing instructions codes for a terminal device, which when executed by the terminal device performs:
determining first uplink control information and second uplink control information, wherein a length of a time domain resource corresponding to the first uplink control information is less than a length of a time domain resource corresponding to the second uplink control information, wherein:
the first uplink control information and the second uplink control information are hybrid automatic repeat request information;
the first uplink control information comprises at least one of channel state information or scheduling request information; and the second uplink control information comprises at least one of hybrid automatic repeat request information, channel state information, and scheduling request information; or the first uplink control information comprises at least two of hybrid automatic repeat request information, channel state information, and scheduling request information, and the second uplink control information comprises at least one of hybrid automatic repeat request information, channel state information, and scheduling request information; and when the time domain resource corresponding to the first uplink control information overlaps with the time domain resource corresponding to the second uplink control information, transmitting third uplink control information on the overlapping time domain resource, wherein the third uplink control information comprises some or all of the first uplink control information, and does not comprise the second uplink control information.

15. An uplink control information transmission method, wherein the method comprises:

receiving, by a base station, first uplink control information on at least one part of a time domain resource corresponding to the first uplink control information;

receiving, by the base station, second uplink control information on at least one part of a time domain resource corresponding to the second uplink control information, wherein:

a length of the time domain resource corresponding to the first uplink control information is less than a length of the time domain resource corresponding to the second uplink control information;

the first uplink control information and the second uplink control information are hybrid automatic repeat request information;

the first uplink control information comprises at least one of channel state information or scheduling request information; and the second uplink control information comprises at least one of hybrid automatic repeat request information, channel state information, and scheduling request information; or the first uplink control information comprises at least two of hybrid automatic repeat request information, channel state information, and scheduling request information, and the second uplink control information comprises at least one of hybrid automatic repeat request information, channel state information, and scheduling request information; and when the time domain resource corresponding to the first uplink control information overlaps with the time domain resource corresponding to the second uplink control information, receiving, by the base station, third uplink control information on the overlapping time domain resource, wherein the third uplink control information comprises some or all of the first uplink control information, and does not comprise the second uplink control information.

16. The method according to claim 15, wherein a length of the time domain resource corresponding to the first uplink control information is less than one millisecond.

17. The method according to claim 15, wherein, a length of the time domain resource corresponding to the first uplink control information is a first transmission time interval (TTI) time length, and the length of the time domain resource corresponding to the second uplink control information is a second TTI time length, where the first TTI time length is less than the second TTI time length.

18. The method according to claim 15, wherein the third uplink control information comprises some or all of the first uplink control information, and does not comprise the second uplink control information comprises:

the first uplink control information comprises the hybrid automatic repeat request information and the scheduling request information, and the second uplink control information comprises the channel state information and does not comprise the hybrid automatic repeat request information and the scheduling request information; or the second uplink control information comprises fifth uplink control information, the second uplink control information comprises at least one of the hybrid automatic repeat request information or the scheduling request information, and the first uplink control information comprises the channel state information and does not comprise the hybrid automatic repeat request information and the scheduling request information.

19. The method according to claim 15, wherein the third uplink control information comprises fourth uplink control information, the first uplink control information comprises at least one of the hybrid automatic repeat request information or the scheduling request information, and the second uplink control information comprises the channel state information and does not comprise the hybrid automatic repeat request information and the scheduling request information.

20. The method according to claim 15, wherein priority of the first uplink control information is higher than priority of the second uplink control information.

21. A communication apparatus, wherein the apparatus comprises:

a receiver, configured to:

receive first uplink control information on at least one part of a time domain resource corresponding to the first uplink control information;

receive second uplink control information on at least one part of a time domain resource corresponding to the second uplink control information, wherein:

a length of the time domain resource corresponding to the first uplink control information is less than a length of the time domain resource corresponding to the second uplink control information;

the first uplink control information and the second uplink control information are hybrid automatic repeat request information;

the first uplink control information comprises at least one of channel state information or scheduling request information; and the second uplink control information comprises at least one of hybrid automatic repeat request information, channel state information, and scheduling request information; or the first uplink control information comprises at least two of hybrid automatic repeat request information, channel state information, and scheduling request information, and the second uplink control information comprises at least one of hybrid automatic repeat request information, channel state information, and scheduling request information; and a processor, configured to determine the time domain resource corresponding to the first uplink control information overlaps with the time domain resource corresponding to the second uplink control information; and, wherein the receiver is further configured to receive third uplink control information on the overlapping time domain resource, wherein the third uplink control information comprises some or all of the first uplink control information, and does not comprise the second uplink control information.

22. The apparatus according to claim 21, wherein a length of the time domain resource corresponding to the first uplink control information is less than one millisecond.

23. The apparatus according to claim 21, wherein,
a length of the time domain resource corresponding to the first uplink control information is a first transmission time interval (TTI) time length, and the length of the time domain resource corresponding to the second uplink control information is a second TTI time length, where the first TTI time length is less than the second TTI time length.

24. The apparatus according to claim 21, wherein the third uplink control information comprises some or all of the first uplink control information, and does not comprise the second uplink control information comprises:
the first uplink control information comprises the hybrid automatic repeat request information and the scheduling request information, and the second uplink control information comprises the channel state information and does not comprise the hybrid automatic repeat request information and the scheduling request information; or
the second uplink control information comprises fifth uplink control information, the second uplink control information comprises at least one of the hybrid automatic repeat request information or the scheduling request information, and the first uplink control information comprises the channel state information and does not comprise the hybrid automatic repeat request information and the scheduling request information.

25. The apparatus according to claim 21, wherein the third uplink control information comprises fourth uplink control information, the first uplink control information comprises at least one of the hybrid automatic repeat request information or the scheduling request information, and the second uplink control information comprises the channel state information and does not comprise the hybrid automatic repeat request information and the scheduling request information.

26. The apparatus according to claim 21, wherein priority of the first uplink control information is higher than priority of the second uplink control information.

27. A non-transitory computer readable medium storing instructions codes for a terminal device, which when executed by the terminal device performs:
receiving first uplink control information on at least one part of a time domain resource corresponding to the first uplink control information;
receiving second uplink control information on at least one part of a time domain resource corresponding to the second uplink control information, wherein:
a length of the time domain resource corresponding to the first uplink control information is less than a length of the time domain resource corresponding to the second uplink control information;
the first uplink control information and the second uplink control information are hybrid automatic repeat request information;
the first uplink control information comprises at least one of channel state information or scheduling request information; and the second uplink control information comprises at least one of hybrid automatic repeat request information, channel state information, and scheduling request information; or
the first uplink control information comprises at least two of hybrid automatic repeat request information, channel state information, and scheduling request information, and the second uplink control information comprises at least one of hybrid automatic repeat request information, channel state information, and scheduling request information; and
when the time domain resource corresponding to the first uplink control information overlaps with the time domain resource corresponding to the second uplink control information, receiving third uplink control information on the overlapping time domain resource, wherein the third uplink control information comprises some or all of the first uplink control information, and does not comprise the second uplink control information.

* * * * *